(12) United States Patent
Kuronuma et al.

(10) Patent No.: US 12,487,675 B2
(45) Date of Patent: Dec. 2, 2025

(54) PRESSURE SENSE DEVICE AND OPERATING DEVICE

(71) Applicant: Sony Interactive Entertainment Inc., Tokyo (JP)

(72) Inventors: Toru Kuronuma, Kanagawa (JP); Akira Homma, Totigi (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 18/843,855

(22) PCT Filed: Mar. 31, 2022

(86) PCT No.: PCT/JP2022/016868
§ 371 (c)(1),
(2) Date: Sep. 4, 2024

(87) PCT Pub. No.: WO2023/188388
PCT Pub. Date: Oct. 5, 2023

(65) Prior Publication Data
US 2025/0190052 A1    Jun. 12, 2025

(51) Int. Cl.
*G06F 3/01*        (2006.01)
*G06F 3/0487*      (2013.01)

(52) U.S. Cl.
CPC ............ *G06F 3/014* (2013.01); *G06F 3/0487* (2013.01)

(58) Field of Classification Search
CPC ........... G06F 3/014; G06F 3/0487; G06F 3/01
See application file for complete search history.

(56) References Cited

U.S. PATENT DOCUMENTS

| 2019/0332140 | A1* | 10/2019 | Wang ..................... G06F 3/044 |
| 2020/0326780 | A1* | 10/2020 | Kearney ............. G06F 3/04815 |
| 2021/0096657 | A1* | 4/2021 | D'Amone ............... G06F 3/014 |
| 2022/0091683 | A1* | 3/2022 | Beyhs ................... G06F 3/0362 |

FOREIGN PATENT DOCUMENTS

| JP | 61260988 A | 11/1986 |
| JP | 2013091114 A | 5/2013 |
| JP | 2021196828 A | 12/2021 |

OTHER PUBLICATIONS

Shan-Yuan Teng et al., Touch&Fold: A Foldable Haptic Actuator for Rendering Touch in Mixed Reality, CHI Conference on Human Factors in Computing Systems (CHI '21), May 8-13, 2021, Yokohama, Japan. (Year: 2021).*

(Continued)

*Primary Examiner* — Temesghen Ghebretinsae
*Assistant Examiner* — Ivelisse Martinez Quiles
(74) *Attorney, Agent, or Firm* — Kilpatrick Townsend & Stockton LLP

(57) ABSTRACT

A pressure sense device includes an annular fitting member, a slide member disposed so as to be slidable in a first rotational direction about a central axis of the fitting member and an opposite direction from the first rotational direction along an outer circumferential surface of the fitting member, a driving device configured to cause the slide member to slide, and a protruding member configured to protrude into an inside of the fitting member as the slide member slides in the first rotational direction.

15 Claims, 19 Drawing Sheets

(56) References Cited

OTHER PUBLICATIONS

Shan-Yuan Teng et al., Demonstrating Touch&Fold: A Foldable Haptic Actuator for Rendering Touch in Mixed Reality, Special Interest Group on Computer Graphics and Interactive Techniques Conference Emerging Technologies (SIGGRAPH '21 Emerging Technologies), Aug. 9-13, 2021, Virtual Event, USA. (Year: 2021).*
International Search Report for corresponding PCT Application No. PCT/JP2022/016868, 4 pages, dated Jun. 14, 2023.
Shan-Yuan Teng, et al., "Touch & Fold: A Foldable Haptic Actuator for Rendering Touch in Mixed Reality," Human Computer Integration Lab, University of Chicago, 14 pages, Mar. 7, 2022 (for relevancy, see instant specification as filed).

* cited by examiner

PRESSURE SENSE DEVICE AND OPERATING DEVICE

TECHNICAL FIELD

The present invention relates to a pressure sense device and an operating device.

BACKGROUND ART

Conventionally, an operating device is known which feeds back a tactile sense to a user in virtual reality and mixed reality. As such an operating device, a foldable haptic device is known which is fitted to a finger of a hand of the user and provides a tactile feedback to the user by pressing the pad of the finger of the hand when the user touches a virtual object (see NPL 1, for example).

The haptic device described in NPL 1 includes an annular member into which a fingertip is inserted, a motor provided to the annular member, a pinion provided to a rotor of the motor, and a slide member that meshes with the pinion.

The slide member includes a rack portion meshing with the pinion, a hinge portion, a wedge portion, and a contact portion. When the motor is driven to rotate the pinion to one side, the slide member slides in a first direction along the outer circumferential surface of the annular member. When the hinge portion passes a notch of the annular member, the slide member is bent at the wedge portion located on an opposite side of the hinge portion from the rack portion, and the contact portion of the slide member comes into contact with the pad of the finger of the user. A click feeling is thus given to the pad of the finger of the user. When the pinion is rotated to another side, the slide member slides in an opposite direction from the first direction along the external surface of the annular member, and the contact between the contact portion and the finger of the user is released.

CITATION LIST

Non-Patent Literature

[NPL 1] Human Computer Integration Lab (Lopes' Lab) at University of Chicago "Touch & Fold: A Foldable Haptic Actuator for Rendering Touch in Mixed Reality," on the Internet, [date of retrieval: Mar. 7, 2022], URL: https://lab.plopes.org/published/2021-CHI-TouchFold.pdf

SUMMARY

Technical Problem

There has recently been an increasing desire for a configuration capable of implementing a tactile feedback in virtual reality and mixed reality, and there has been a desire for a configuration capable of giving an appropriate tactile feedback according to operation of the user.

Solution to Problem

A pressure sense device according to a first aspect of the present invention includes a tubular fitting member, a slide member disposed so as to be slidable in a first rotational direction about a central axis of the fitting member and an opposite direction from the first rotational direction along an outer circumferential surface of the fitting member, a driving device configured to cause the slide member to slide, and a protruding member configured to protrude into an inside of the fitting member as the slide member slides in the first rotational direction.

An operating device according to a second aspect of the present invention includes the pressure sense device according to the foregoing first aspect.

DESCRIPTION OF EMBODIMENTS

First Embodiment

A first embodiment of the present invention will hereinafter be described with reference to the drawings.

[General Configuration of Operating System]

Figure 1:
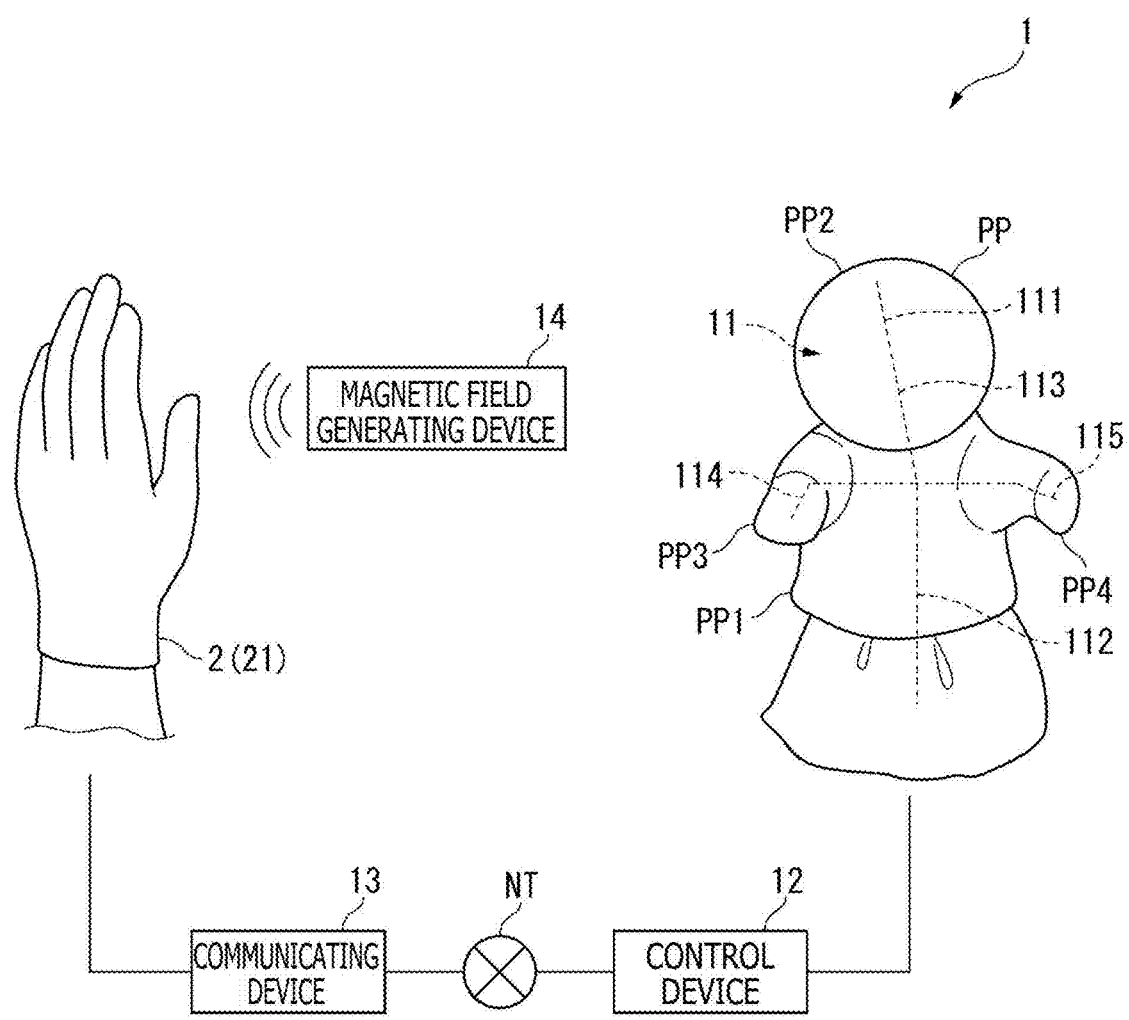
FIG. 1 is a schematic diagram illustrating a general configuration of an operating system in a first embodiment.

FIG. 1 is a schematic diagram illustrating a general configuration of an operating system 1 according to the present embodiment.

As illustrated in FIG. 1, the operating system 1 according to the present embodiment includes a puppet operating device 11, a control device 12, a communicating device 13, a magnetic field generating device 14, and an operating device 2. In the operating system 1, the operating device 2 remotely operates the puppet operating device 11 mounted in a puppet PP via the control device 12 and the communicating device 13, and the operating device 2 makes a user perceive a stimulus detected in the puppet operating device 11.

Incidentally, the puppet PP is a hollow doll having a trunk portion PP1, a head portion PP2, a right arm portion PP3, and a left arm portion PP4. The puppet PP is formed by cloth, for example.

In addition, the magnetic field generating device 14 generates a magnetic field to be detected by a posture detecting unit 22 to be described later in the operating device 2.

[Configuration of Puppet Operating Device]

The puppet operating device 11 is an operation target to be operated by the operating device 2. The puppet operating device 11 is inserted within the puppet PP and causes the puppet PP to operate. In addition, the puppet operating device 11 can also be said to be an operating device that is operated by another user different from the user using the operating device 2, and gives an external stimulus to the user by the operating device 2.

As illustrated in FIG. 1, the puppet operating device 11 includes a driving unit 111.

The driving unit 111 operates according to a control signal input from the control device 12. The driving unit 111 causes the head portion PP2, the right arm portion PP3, and the left arm portion PP4 to operate. The driving unit 111 includes a supporting unit 112, a head portion driving unit 113, a right arm driving unit 114, and a left arm driving unit 115.

The supporting unit 112 is provided so as to correspond to the trunk portion PP1, and supports the head portion driving unit 113, the right arm driving unit 114, and the left arm driving unit 115.

The head portion driving unit 113 causes the head portion PP2 to bend or extend. The right arm driving unit 114 causes the right arm portion PP3 to bend or extend. The left arm driving unit 115 causes the left arm portion PP4 to bend or extend. The driving units 113 to 115 can be exemplified by a configuration including a plurality of links configured to be bendable with respect to each other and a motor that causes the plurality of links to operate.

Figure 2:
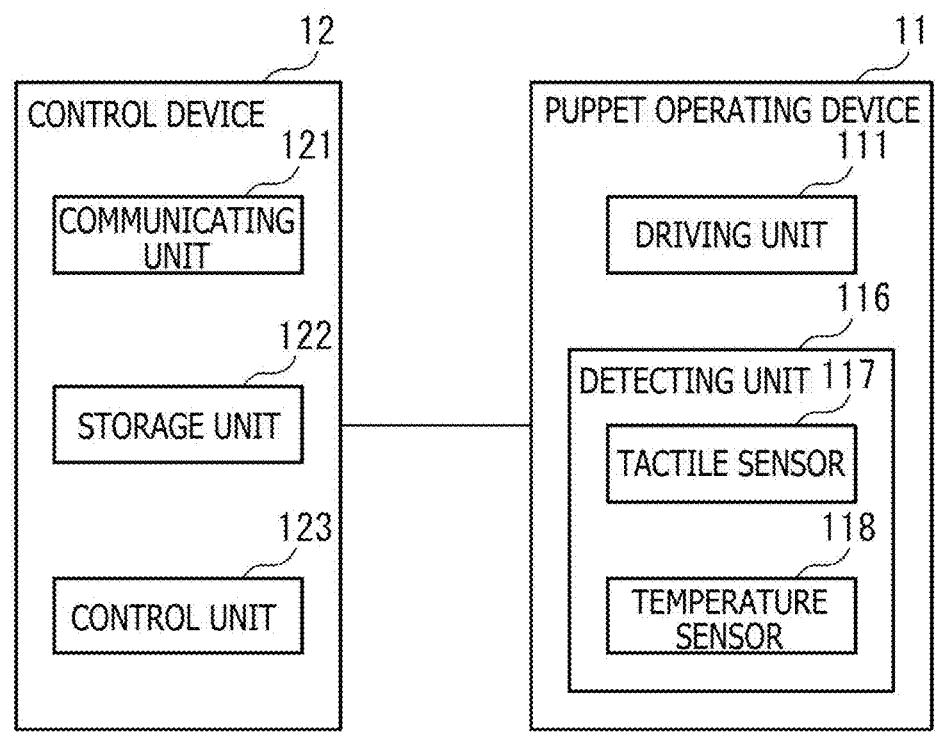
FIG. 2 is a block diagram illustrating a configuration of a puppet operating device and a control device in the first embodiment.

FIG. 2 is a block diagram illustrating a configuration of the puppet operating device 11 and the control device 12.

As illustrated in FIG. 2, the puppet operating device 11 further includes a detecting unit 116.

The detecting unit 116 detects a stimulus acting on the puppet operating device 11, and outputs a result of the detection to the control device 12. The detecting unit 116 includes a tactile sensor 117 and a temperature sensor 118.

The tactile sensor 117 detects the approaching of an object in a noncontact manner. In addition, the tactile sensor 117 detects a pressure applied to a contacted object. In other words, the tactile sensor 117 detects a pressure acting from the contacted object. The tactile sensor 117 is, for example, provided at a position corresponding to each of the trunk portion PP1, the head portion PP2, a distal end portion of the right arm portion PP3, and a distal end portion of the left arm portion PP4 in the puppet operating device 11. The tactile sensor 117 transmits a detection result to the control device 12. Incidentally, the tactile sensor 117 has a function as a proximity sensor for detecting the approaching of an object and a function as a pressure sensor. However, without being limited to this, the tactile sensor 117 may have one of the function as the proximity sensor and the function as the pressure sensor. In addition, at least one of the proximity sensor and the pressure sensor may be provided in place of the tactile sensor 117.

The temperature sensor 118 detects temperature. The temperature sensor 118 is, for example, provided at a position corresponding to each of the trunk portion PP1, the head portion PP2, the right arm portion PP3, and the left arm portion PP4 in the puppet operating device 11. The temperature sensor 118 transmits the detected temperature to the control device 12.

[Configuration of Control Device]

The control device 12 controls operation of the puppet operating device 11. Specifically, the control device 12 causes the driving unit 111 to drive according to operation information received from the operating device 2 via the communicating device 13, thereby causing the puppet operating device 11, and in turn the puppet PP, to operate. As illustrated in FIG. 2, the control device 12 includes a communicating unit 121, a storage unit 122, and a control unit 123.

The communicating unit 121 not only communicates with the puppet operating device 11 but also communicates with the communicating device 13 via a network NT. Under control of the control unit 123, the communicating unit 121 not only outputs the operation information received from the communicating device 13 to the control unit 123 but also transmits detection information indicating a result of detection by the detecting unit 116 of the puppet operating device 11 to the communicating device 13. Incidentally, the communicating unit 121 may be connected to the puppet operating device 11 by wire, or may be connected thereto by a communication system compliant with a wireless communication standard such as Bluetooth (registered trademark) and IEEE 802.11.

The storage unit 122 stores a program and data necessary for the operation of the control device 12. For example, the storage unit 122 includes information for connection to the communicating device 13, a type of the puppet operating device 11, an operating program for causing the puppet operating device 11 to operate on the basis of the received operation information, and the like.

The control unit 123 includes an arithmetic processing circuit such as a CPU (Central Processing Unit) or the like. The control unit 123 controls the operation of the puppet operating device 11 in accordance with the program stored in the storage unit 122. Specifically, the control unit 123 transmits a control signal for causing the driving unit 111 of the puppet operating device 11 to operate on the basis of the operation information received from the communicating device 13, to the puppet operating device 11 via the communicating unit 121. In addition, the control unit 123 transmits detection information indicating a result of detection by the detecting unit 116 of the puppet operating device 11 to the communicating device 13 by the communicating unit 121.

[Configuration of Communicating Device]

Figure 3:
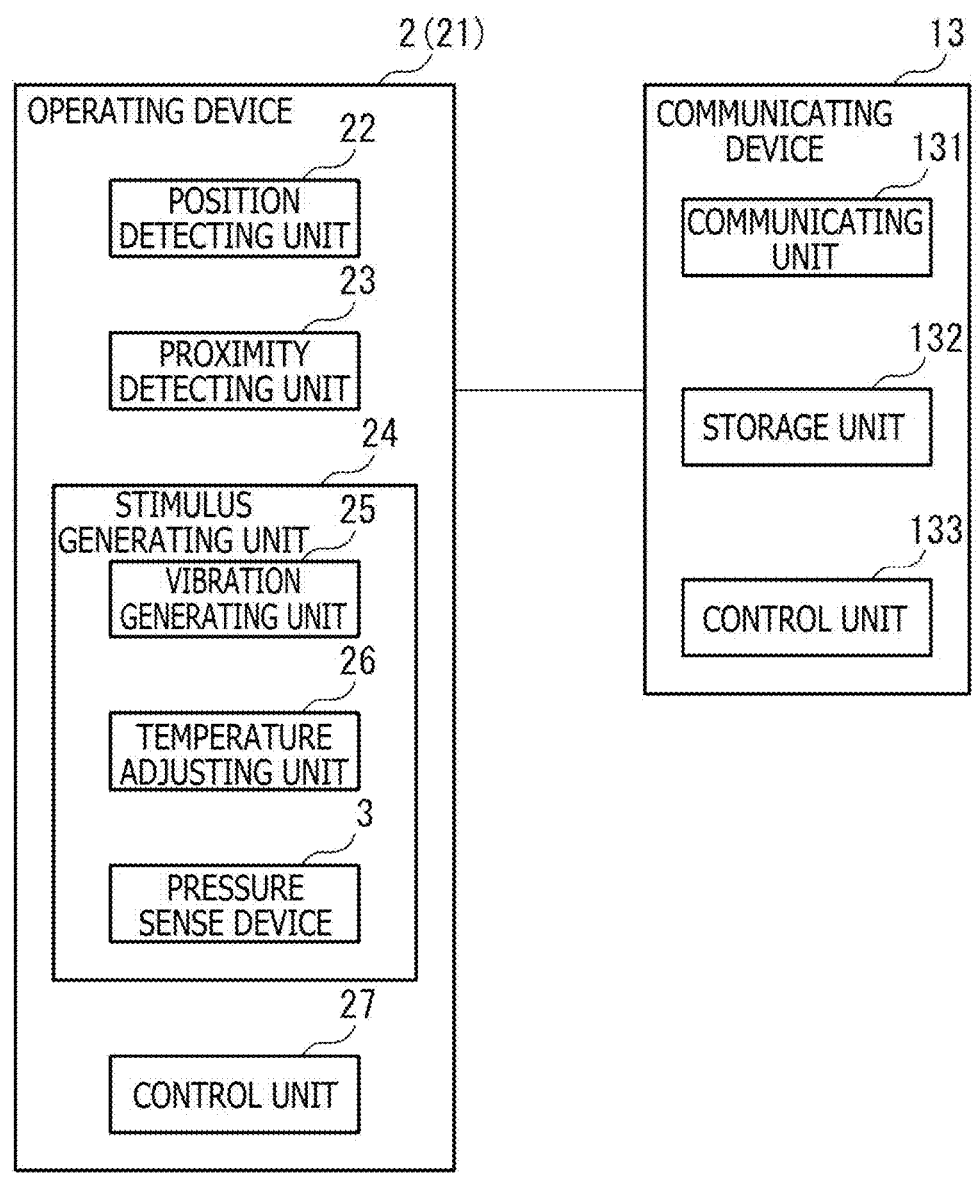
FIG. 3 is a block diagram illustrating a configuration of a communicating device and an operating device in the first embodiment.

FIG. 3 is a block diagram illustrating a configuration of the communicating device 13 and the operating device 2.

As illustrated in FIG. 1, the communicating device 13 not only transmits the operation information corresponding to an operation signal input from the operating device 2 to the control device 12 but also causes the operating device 2 to operate on the basis of the detection information received from the control device 12. That is, the communicating device 13 is an operating device side control device that controls a part of a configuration possessed by the operating device 2. As illustrated in FIG. 3, the communicating device 13 includes a communicating unit 131, a storage unit 132, and a control unit 133.

The communicating unit 131 not only communicates with the operating device 2 but also communicates with the control device 12 via the network NT. Under control of the control unit 133, the communicating unit 131 not only outputs the detection information received from the control device 12 to the control unit 133 but also transmits the operation information based on the operation signal received from the operating device 2 to the control device 12. Incidentally, the communicating unit 131 may be connected to the operating device 2 by wire, or may be connected thereto by a communication system compliant with a wireless communication standard such as Bluetooth (registered trademark) and IEEE 802.11.

The storage unit 132 stores a program and data necessary for the operation of the communicating device 13. For example, the storage unit 132 stores a converting program that converts the operation signal received from the operating device 2 into the operation information suitable for the control device 12 to cause the puppet operating device 11 to operate. In addition, for example, the storage unit 132 stores connection information for connection to the control device 12 that controls the puppet operating device 11 as an operation target of the operating device 2. Therefore, in a case where there are a plurality of sets of control devices 12 and puppet operating devices 11 connected to the network NT, the storage unit 132 stores connection information for each of the control devices 12.

The control unit 133 converts the operation signal received from the operating device 2 into the above-described operation information on the basis of the converting program, and transmits the operation information to the control device 12 by the communicating unit 131. In addition, the control unit 133 generates a control signal for causing the operating device 2 to operate on the basis of the detection information received from the control device 12 by the communicating unit 131, and transmits the generated control signal to the operating device 2, thereby controlling a part of the configuration possessed by the operating device 2.

[Configuration of Operating Device]

The operating device 2 remotely operates the puppet operating device 11. Specifically, the operating device 2 detects movement of the user, and transmits an operation signal corresponding to the detected movement of the user to the communicating device 13, thereby causing the puppet operating device 11 to operate via the communicating device 13 and the control device 12. In the present embodiment, the operating device 2 detects movement of fingers (a hand and fingers) of the user. In addition, the operating device 2 gives an external stimulus to the user according to the control signal received from the communicating device 13 on the basis of a result of detection by the detecting unit 116 of the puppet operating device 11.

Figure 4:
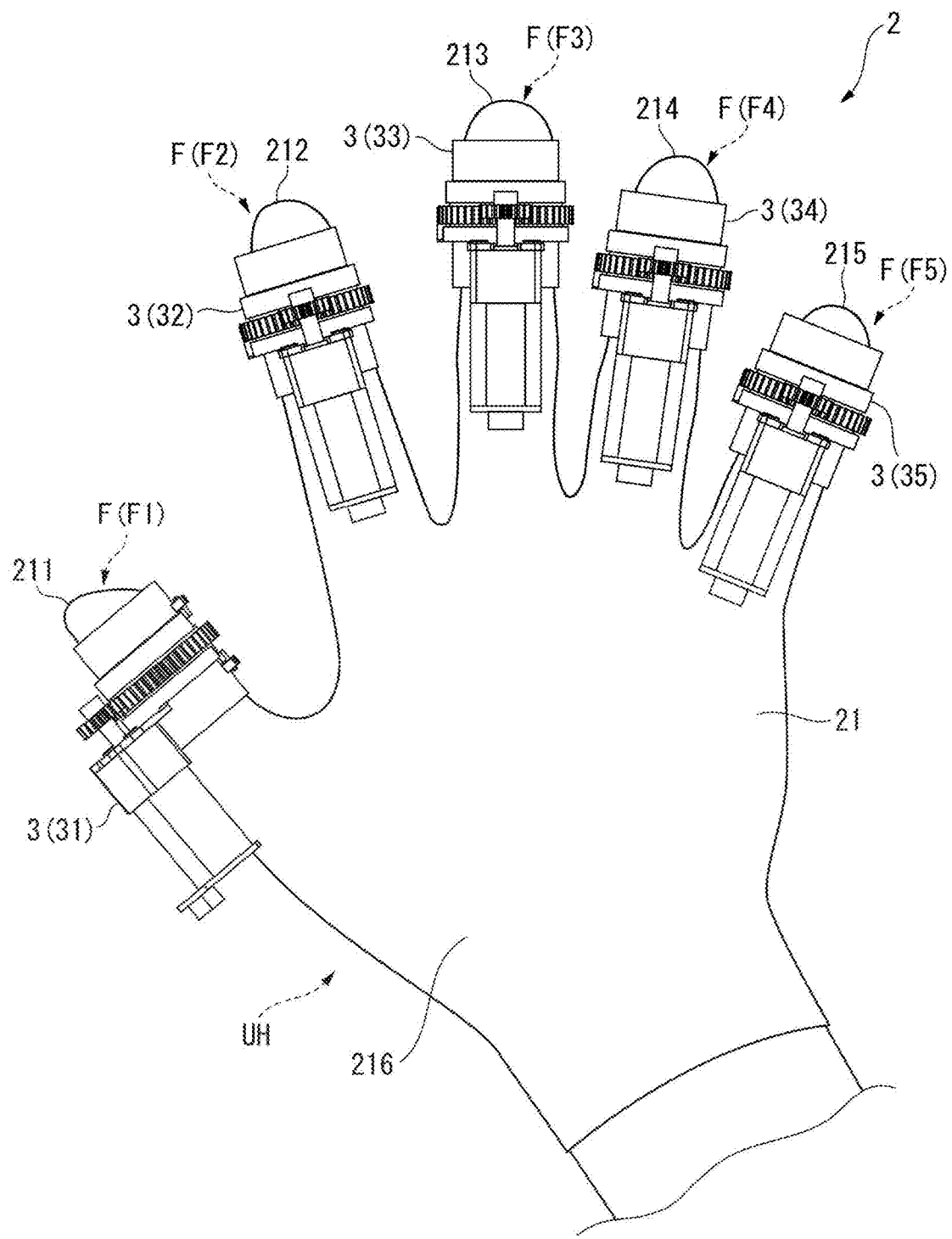
FIG. 4 is a plan view illustrating the operating device in the first embodiment.

FIG. 4 is a plan view illustrating the operating device 2.

As illustrated in FIG. 4, the operating device 2 includes a glove 21 fitted to one hand UH of the user and a plurality of pressure sense devices 3 (31 to 35).

The glove 21 is formed by fiber having elasticity, for example. Specifically, the glove 21 includes finger portions 211 to 215 into which the respective fingers F of the one hand UH are individually inserted and a hand palm portion 216 provided so as to correspond to the palm and the back of the one hand UH.

[Configuration of Pressure Sense Device]

Each of the plurality of pressure sense devices 3 gives a pressure sense to the user by pressing a part of the body of the user. In the present embodiment, the plurality of pressure sense devices 3 are respectively provided to the respective finger portions 211 to 215 in the glove 21, and give a pressure sense to the fingers F of the user. That is, the plurality of pressure sense devices 3 are respectively fitted to a thumb F1, an index finger F2, a middle finger F3, a third finger F4, and a little finger F5.

Specifically, the plurality of pressure sense devices 3 include a pressure sense device 31 fitted to the thumb F1, a pressure sense device 32 fitted to the index finger F2, a pressure sense device 33 fitted to the middle finger F3, a pressure sense device 34 fitted to the third finger F4, and a pressure sense device 35 fitted to the little finger F5.

Figure 5:
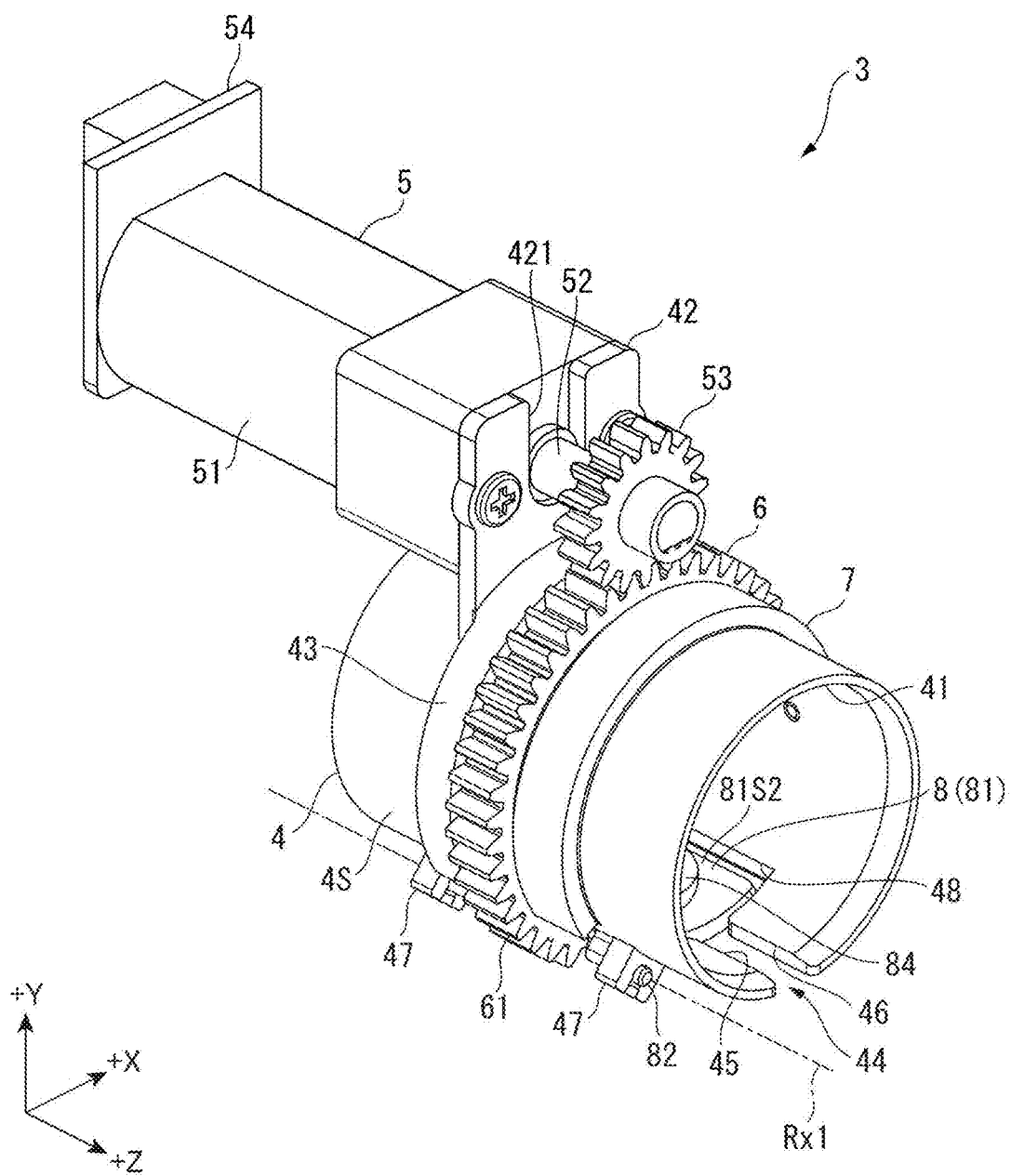
FIG. 5 is a perspective view illustrating a pressure sense device in the first embodiment.
Figure 6:
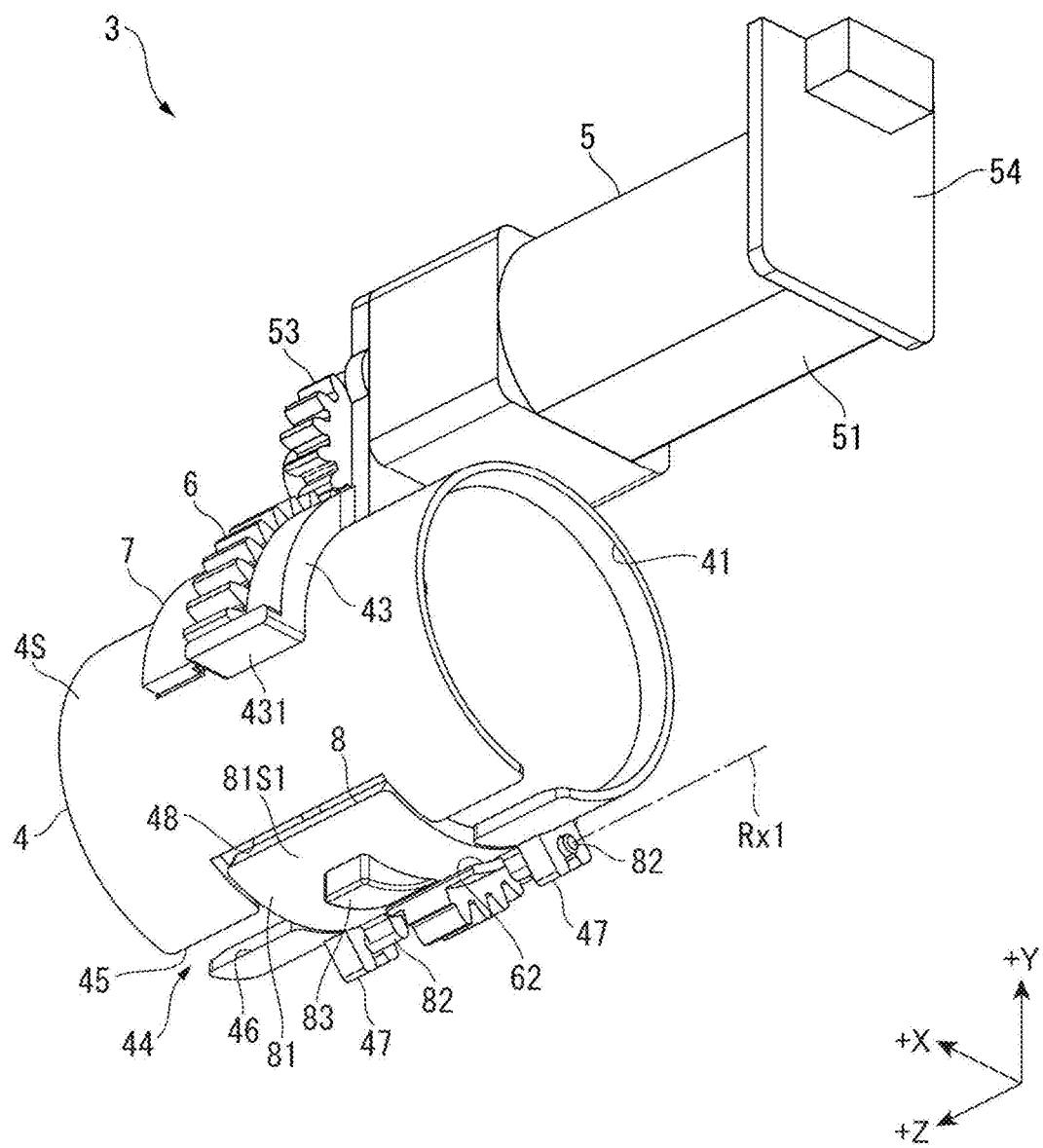
FIG. 6 is a perspective view illustrating the pressure sense device in the first embodiment.

FIG. 5 and FIG. 6 are perspective views illustrating a pressure sense device 3. Specifically, FIG. 5 is a perspective view illustrating the pressure sense device 3 as viewed from a distal end side of a finger fitted therewith, and FIG. 6 is a perspective view illustrating the pressure sense device 3 as viewed from a base side of the finger fitted therewith.

As illustrated in FIG. 5 and FIG. 6, the pressure sense device 3 includes a fitting member 4, a driving device 5, a slide member 6, a guide member 7, and a protruding member 8.

Incidentally, in the following description, three directions orthogonal to one another will be set as a +X direction, a +Y direction, and a +Z direction. In the present embodiment, the +Z direction will be set as a direction along the central axis of the fitting member 4 and a direction of insertion of the finger into the fitting member 4. A right direction as viewed from the +Z direction will be set as the +X direction. An upward direction as viewed from the +Z direction will be set as the +Y direction. In addition, though not illustrated, an opposite direction from the +X direction will be set as a −X direction, an opposite direction from the +Y direction will be set as a −Y direction, and an opposite direction from the +Z direction will be set as a −Z direction.

[Configuration of Fitting Member]

The fitting member 4 is formed in a tubular shape. A finger of the user is inserted into the inside of the fitting member 4 in the +Z direction. That is, the fitting member 4 has an opening portion 41 formed in such a manner as to penetrate the fitting member 4 along the +Z direction. The finger F of the user is inserted into the opening portion 41. In the present embodiment, the fitting member 4 is formed in a cylindrical shape.

In addition, the fitting member 4 includes a fixing portion 42, a guide portion 43, a notch 44, supporting portions 47, and a recessed portion 48.

The fixing portion 42 is a part projecting in the +Y direction from an outer circumferential surface 4S of the fitting member 4. The driving device 5 is fixed to the fixing portion 42. Specifically, an end portion in the +Z direction in a driving device main body 51 of the driving device 5 is fixed to the fixing portion 42 by screws SC.

The fixing portion 42 is formed in substantially the shape of a U as viewed from the +Z direction. That is, the fixing portion 42 has a penetrating portion 421 that penetrates in the +Z direction. A rotor 52 of the driving device 5 is inserted through the penetrating portion 421 along the +Z direction.

The guide portion 43 protrudes from the outer circumferential surface 4S along the circumferential direction of the outer circumferential surface 4S. The guide portion 43 is provided to the outer circumferential surface 4S to guide the sliding of the slide member 6 along the outer circumferential surface 4S. In addition, the guide portion 43 and the guide member 7 attached to the outer circumferential surface 4S sandwich the slide member 6 therebetween. Incidentally, an end portion of the guide portion 43 in a clockwise direction as viewed from the +Z direction is provided with a regulating portion 431 that can be in contact with an end portion of the slide member 6, as illustrated in FIG. 6. The regulating portion 431 regulates the sliding of the slide member 6 in the clockwise direction as viewed from the +Z direction. That is, the regulating portion 431 defines one end of a sliding range of the slide member 6.

The notch 44 is formed along the +Z direction in a part on an opposite side from a part provided with the fixing portion 42 in the fitting member 4. In other words, the notch 44 is formed along the +Z direction in a part in the −Y direction in the fitting member 4. That is, the notch 44 is cut in such a manner as to connect an end portion in the −Z direction and an end portion in the +Z direction in the fitting member 4 to each other and straddle the end portion in the −Z direction and the end portion in the +Z direction in the fitting member 4.

A distance between end edges 45 and 46 of the fitting member 4 separated from each other by the notch 44, that is, between the end edge 45 in the −X direction and the end edge 46 in the +X direction is increased when the finger is inserted into the opening portion 41. That is, the fitting member 4 has such flexibility that the inside diameter of the opening portion 41 can be increased. Thus, the fitting member 4 fits the inserted finger.

The supporting portions 47 are provided to a part in the −Y direction in the outer circumferential surface 4S. Specifically, the supporting portions 47 are disposed at a position on a clockwise side with respect to the end edge 45 as viewed from the +Z direction. The supporting portions 47 support the protruding member 8 rotatably about a rotational axis Rx1 along the +Z direction. In the present embodiment, the supporting portions 47 support hinge portions 82 of the protruding member 8, the hinge portions 82 forming the rotational axis Rx1. However, the supporting portions 47 may have a configuration provided with a pin that is inserted into the protruding member 8 and forms the rotational axis Rx1.

As illustrated in FIG. 6, the recessed portion 48 is provided to the end edge 46 in the +X direction among the end edges 45 and 46 formed by the notch 44. Specifically, the recessed portion 48 is a recessed portion recessed in the +X direction of separating from the end edge 45 at a center in the +Z direction in the end edge 46. In other words, the recessed portion 48 is a recessed portion recessed in a first rotational direction +D1 to be described later from the end edge 46 in the first rotational direction +D1 among the end edges 45 and 46 formed by the notch 44. A free end as a part on an opposite side from the hinge portions 82 to be described later in the protruding member 8 supported by the supporting portions 47 is disposed within the recessed portion 48. Incidentally, though not illustrated, the end edge 45 in an opposite direction −D1 from the first rotational direction +D1 to be described later is provided with a recessed portion recessed in the opposite direction −D1. A part of the protruding member 8 is disposed inside the recessed portions of the respective end edges 45 in such a manner as to straddle the recessed portion of the end edge 45 and the recessed portion 48 of the end edge 46.

Figure 7:
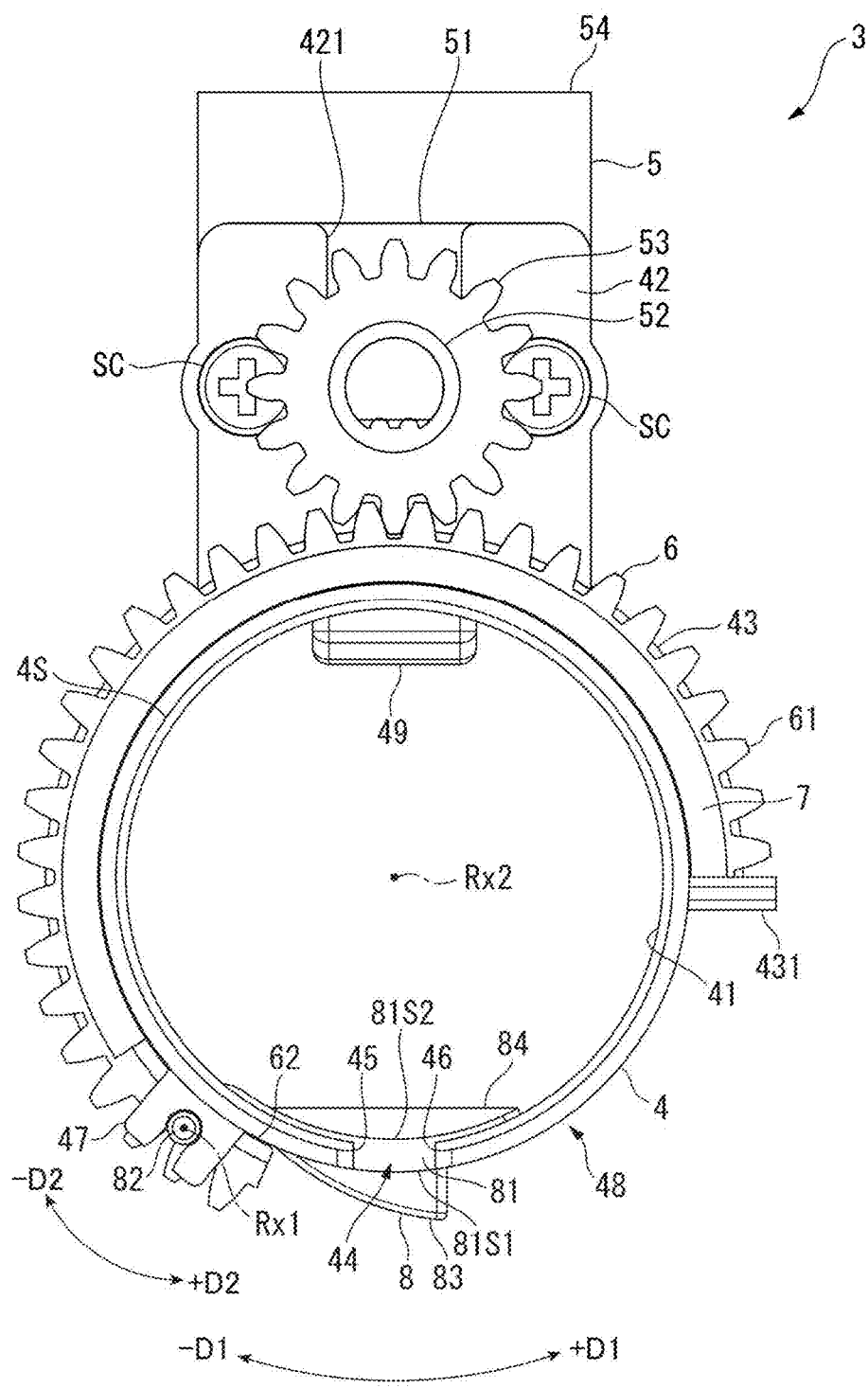
FIG. 7 is a view illustrating the pressure sense device in the first embodiment.

FIG. 7 is a view illustrating the pressure sense device 3 as viewed from the +Z direction. As illustrated in FIG. 7, the fitting member 4 further includes a holding portion 49.

The holding portion 49 is provided to a part in the +Y direction within the opening portion 41. In other words, the holding portion 49 is provided at a position on an opposite side from the disposition side of the protruding member 8 within the opening portion 41. The holding portion 49 protrudes from the inner surface of the opening portion 41 in the −Y direction, that is, to the disposition side of the protruding member 8.

The holding portion 49 comes into contact with a part (for example, a nail) of the finger F inserted within the opening portion 41. It is thus possible to suppress the rocking of the finger F within the opening portion 41. In addition, when a pressing portion 84 to be described later in the protruding member 8 presses the finger F in the +Y direction, the holding portion 49 suppresses movement of the finger F in the +Y direction, thereby enabling the pressing portion 84 to press the pad of the finger F reliably.

[Configuration of Driving Device]

The driving device 5 illustrated in FIGS. 5 to 7 engages with the slide member 6 and causes the slide member 6 to slide. The driving device 5 includes a motor such as a stepping motor, for example. The driving device 5 includes the driving device main body 51, the rotor 52, a pinion 53, and a control board 54.

The driving device main body 51 is fixed to the fixing portion 42 by the screws SC.

The rotor 52 projects in the +Z direction from the driving device main body 51. The rotor 52 passes through the penetrating portion 421 along the +Z direction when the driving device main body 51 is fixed to the fixing portion 42.

The pinion 53 is fixed to a distal end portion of the rotor 52 and rotates integrally with the rotor 52. The pinion 53 meshes with a rack 61, which will be described later, of the slide member 6 and causes the slide member 6 to slide as the rotor 52 rotates.

The control board 54 is provided to an end portion in the −Z direction in the driving device main body 51. The control board 54 is a control unit that controls the driving device 5 to cause the rotor 52 to rotate. Specifically, the control board 54 controls the driving device 5 to not only switch between a case of making a pressure sense act in the finger F and a case of not making a pressure sense act in the finger F but also adjust a pressing force against the finger F. Incidentally, the control board 54 causes the driving device 5 to operate on the basis of a control signal input from a control unit 27 to be described later.

[Configuration of Slide Member]

The slide member 6 is formed in an arcuate shape about substantially the center of the opening portion 41 as viewed from the +Z direction and is attached to the fitting member 4 in such a manner as to be slidable along the outer circumferential surface 4S. In the present embodiment, as illustrated in FIG. 7, the slide member 6 is formed with such a dimension as to cover ¾ of the outer circumferential surface 4S along a circumferential direction about the center of the fitting member 4 as viewed from the +Z direction. The slide member 6 includes a rack 61 and an abutment portion 62.

The rack 61 is provided to the outer circumferential surface of the slide member 6 formed in an arcuate shape. The rack 61 meshes with the pinion 53. Therefore, when the pinion 53 is rotated, the slide member 6 rotates in the first rotational direction +D1, which is a circumferential direction about a rotational axis Rx2 that passes through the center of the opening portion 41 as viewed from the +Z direction and is along the +Z direction, or in the opposite direction −D1 from the first rotational direction +D1. That is, the slide member 6 is provided to the fitting member 4 in such a manner as to be slidable in the first rotational direction +D1 about the central axis of the fitting member 4 and the opposite direction −D1 from the first rotational direction +D1. Incidentally, the first rotational direction +D1 is a counterclockwise direction about the rotational axis Rx2 as viewed from the +Z direction, and the opposite direction −D1 is a clockwise direction about the rotational axis Rx2 as viewed from the +Z direction.

Such a rack 61 is provided to substantially the whole of the outer circumferential surface of the slide member 6. However, the rack 61 may be provided to a part of the outer circumferential surface of the slide member 6.

The abutment portion 62 is provided to an end portion in the counterclockwise direction about the rotational axis Rx2 when the slide member 6 is viewed from the +Z direction. The abutment portion 62 abuts against a contact portion 83, which will be described later, of the protruding member 8, and makes the protruding member 8 project within the opening portion 41 according to a slide position of the slide member 6. That is, the abutment portion 62 makes the protruding member 8 project to the inside of the fitting member 4 according to the slide position of the slide member 6.

Incidentally, the slide member 6 has such flexibility that the slide member 6 is displaceable according to a displacement of the fitting member 4, which is increased in diameter when the finger is inserted thereinto.

[Configuration of Guide Member]

The guide member 7 is attached to an opposite side of the slide member 6 from the guide portion 43 on the outer circumferential surface 4S. That is, the guide member 7 is attached in the +Z direction with respect to the slide member 6 on the outer circumferential surface 4S. The guide member 7 and the guide portion 43 sandwich the slide member 6 therebetween. The guide member 7 guides the sliding of the slide member 6 together with the guide portion 43, and suppresses the falling off of the slide member 6 from the fitting member 4 in the +Z direction.

[Configuration of Protruding Member]

The protruding member 8 is a pressing piece that is displaced as the slide member 6 slides, thereby pressing the finger of the user inserted within the fitting member 4. Specifically, the protruding member 8 is supported by the supporting portions 47 of the fitting member 4 in such a manner as to be rotatable about the rotational axis Rx1, and is rotated about the rotational axis Rx1 by the sliding of the slide member 6 to press the finger of the user.

Figure 8:
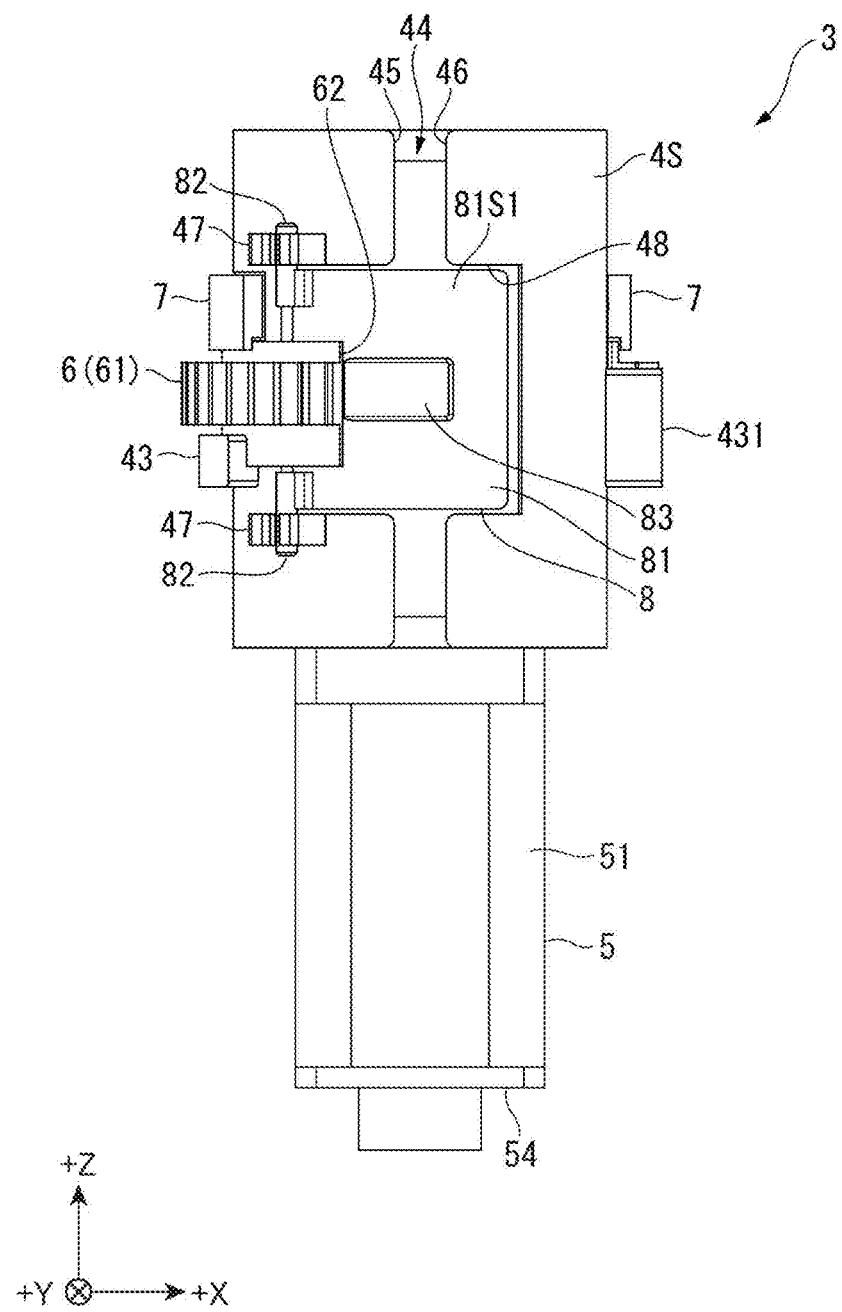
FIG. 8 is a view illustrating the pressure sense device in the first embodiment.

FIG. 8 is a view illustrating the pressure sense device 3 as viewed from the −Y direction.

As illustrated in FIGS. 5 to 8, the protruding member 8 includes a main body portion 81, the hinge portions 82, the contact portion 83, and the pressing portion 84.

The main body portion 81 is a main body of the protruding member 8. As illustrated in FIG. 7, the main body portion 81 is formed in an arcuate shape along the outer circumferential surface 4S of the fitting member 4. As illustrated in FIG. 8, the hinge portions 82, the contact portion 83, and the pressing portion 84 are provided to the main body portion 81.

The hinge portions 82 are pins projecting in the +Z direction and the −Z direction from an end portion in the −X direction in the main body portion 81. The hinge portions 82 are rotatably supported by the supporting portions 47. The protruding member 8 is thus supported by the fitting member 4 in such a manner as to be rotatable about the rotational axis Rx1.

The contact portion 83 is provided on an outward facing surface 81S1 of the main body portion 81 and in the first rotational direction +D1 with respect to the hinge portions 82, and is in contact with the abutment portion 62 of the slide member 6. As illustrated in FIG. 7, the contact portion 83 is provided in such a manner as to project outward in a radial direction having the rotational axis Rx2 as a center from the surface 81S1 toward the first rotational direction +D1 as viewed from the +Z direction. In other words, the contact portion 83 is formed in such a manner as to be increased in a projection dimension in the −Y direction from the surface 81S1 toward the first rotational direction +D1. A dimension between the contact portion 83 and the pressing portion 84 is therefore increased toward the first rotational direction +D1.

Because such a contact portion 83 is provided to the protruding member 8, the protruding member 8 rotates in a second rotational direction +D2 in a case where the slide member 6 slides in the first rotational direction +D1. The second rotational direction +D2 is a clockwise direction about the rotational axis Rx1 as viewed from the +Z direction.

The pressing portion 84 is provided to a surface 81S2 facing in the +Y direction on the main body portion 81. When the abutment portion 62 of the slide member 6 slides in the first rotational direction +D1 in a state of being in contact with the contact portion 83, the pressing portion 84 is inserted into the inside of the fitting member 4, and presses the finger F of the user inserted within the opening portion 41. That is, the pressing portion 84 is an inserting portion to be inserted into the inside of the fitting member 4.

Incidentally, in order to maintain a state of contact with the slide member 6, the pressure sense device 3 may include a biasing member that biases the protruding member 8 clockwise about the rotational axis Rx1. Such a biasing member can be exemplified by a torsion coil spring provided to the hinge portions 82, and can be exemplified by an elastic member in contact with the main body portion 81.

[Operation of Pressure Sense Device]

Figure 9:
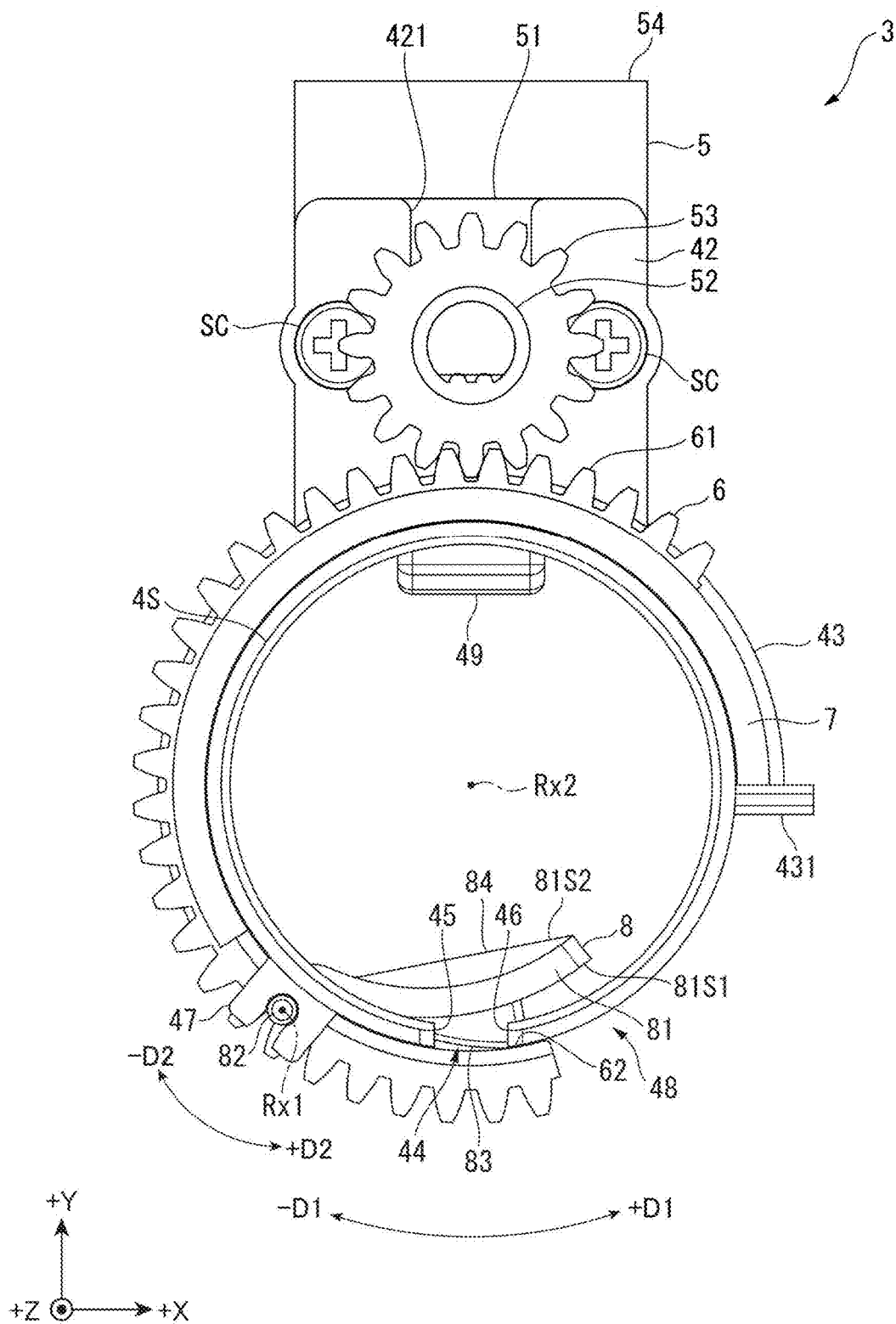
FIG. 9 is a view illustrating the pressure sense device in a case where a slide member in the first embodiment is rotated in a first rotational direction.

FIG. 9 is a view of the pressure sense device 3 as viewed from the +Z direction in a case where the slide member 6 is rotated in the first rotational direction +D1.

In the following, operation of the pressure sense device 3 will be described.

When the pinion 53 is rotated and the slide member 6 is rotated in the first rotational direction +D1 about the rotational axis Rx2 from a position illustrated in FIG. 7, the abutment portion 62 of the slide member 6 slides along the contact portion 83 of the protruding member 8, as illustrated in FIG. 9.

At this time, the projection dimension of the contact portion 83 from the surface 81S1 of the main body portion 81 increases toward the first rotational direction +D1. Therefore, when the abutment portion 62 slides in the first rotational direction +D1 in a state of being in contact with the contact portion 83, the protruding member 8 rotates in the second rotational direction +D2 about the rotational axis Rx1 as viewed from the +Z direction.

When the protruding member 8 thus rotates in the second rotational direction +D2, the free end on the first rotational direction +D1 side in the protruding member 8 is inserted into the opening portion 41, and the pressing portion 84 presses the finger F within the opening portion 41.

Incidentally, an amount of insertion of the pressing portion 84 into the opening portion 41 changes according to an amount of sliding of the slide member 6 in the first rotational direction +D1. For example, in a case where the amount of sliding of the slide member 6 in the first rotational direction +D1 is small, the amount of insertion of the pressing portion 84 into the opening portion 41 is small. In a case where the amount of sliding of the slide member 6 in the first rotational direction +D1 is large, on the other hand, the amount of insertion of the pressing portion 84 into the opening portion 41 is large. The pressing force of the pressing portion 84 against the finger is thus adjusted by adjusting the amount of sliding of the slide member 6.

When the slide member 6 is caused to slide in the opposite direction −D1 about the rotational axis Rx2 from the state of the pressure sense device 3 illustrated in FIG. 9, the protruding member 8 rotates in an opposite direction −D2 from the second rotational direction +D2 about the rotational axis Rx1. Consequently, the amount of insertion of the pressing portion 84 into the opening portion 41 is decreased, and the pressing portion 84 is separated from the finger F.

Thus, the pressure sense device 3 can not only switch between a case of applying the pressing force to the finger F and a case of not applying the pressing force to the finger F according to the rotational direction and the rotational angle of the pinion 53, that is, the sliding direction and the sliding amount of the slide member 6, but also adjust the pressing force against the finger F.

[Other Configuration of Operating Device]

As illustrated in FIG. 3, the operating device 2 includes a posture detecting unit 22, a proximity detecting unit 23, a stimulus generating unit 24, and a control unit 27 in addition to the glove 21 and the plurality of pressure sense devices 3 described above.

Though not illustrated in detail, the posture detecting unit 22 is provided to each of the finger portions 211 to 215 and the hand palm portion 216 of the glove 21, and detects the posture of the one hand UH of the user fitted with the operating device 2. The posture detecting unit 22 provided to each of the finger portions 211 to 215 is, for example, disposed at a position corresponding to the fingertip of each finger F and a position on the nail side of each finger F.

In the present embodiment, the posture detecting unit 22 includes a magnetic sensor whose resistance value changes according to the strength and direction of a magnetic field generated outside the operating device 2 by the magnetic field generating device 14 as a transmitter. Then, each posture detecting unit 22 calculates the positions of the fingers F and the back of the hand of the user, and in turn the posture of the one hand UH, on the basis of a detection result of the magnetic sensor. Incidentally, the calculation of the posture of the one hand UH may be performed by the control unit 27.

The proximity detecting unit 23 includes a proximity sensor that is provided to the glove 21 in such a manner as to correspond to the pad of the fingertip of each finger F and that detects the approaching of an object toward each finger F. In a case where, for example, the user intends to grasp the object by the fingers F of the one hand UH fitted with the operating device 2, the proximity detecting unit 23 detects whether or not the object has come into contact with the fingers F, that is, whether or not the one hand UH of the user has grasped the object.

The stimulus generating unit 24 is provided to the glove 21, and gives an external stimulus to the user by operating on the basis of a control signal received from the communicating device 13. That is, the stimulus generating unit 24 reproduces a stimulus to the puppet PP in a pseudo manner on the basis of the control signal based on a detection result of the detecting unit 116 that detects the stimulus to the puppet operating device 11.

The stimulus generating unit 24 includes a vibration generating unit 25 and a temperature adjusting unit 26 as well as the pressure sense device 3 described above.

The vibration generating unit 25 produces an illusion as if an object were in contact with the one hand UH of the user by providing vibration to the one hand UH of the user. The vibration generating unit 25 is provided to each of the finger portions 211 to 215 of the glove 21. The vibration generating unit 25 can employ a configuration including a voice coil motor, for example.

The temperature adjusting unit 26 is provided to the finger portions 211 to 215 and the hand palm portion 216, and gives a warm sense and a cold sense to the user. The temperature adjusting unit 26 can include a thermoelectric conversion element such as a Peltier element, for example.

The control unit 27 is, for example, provided at a position corresponding to a wrist of the user, and controls the operation of the operating device 2. The control unit 27 is electrically connected to the posture detecting unit 22, the proximity detecting unit 23, and the stimulus generating unit 24. The control unit 27 transmits an operation signal indicating the posture of the one hand UH detected by the posture detecting unit 22 to the communicating device 13, and transmits a detection signal indicating a result of detection by the proximity detecting unit 23 to the communicating device 13. In addition, the control unit 27 causes the vibration generating unit 25, the temperature adjusting unit 26, and the pressure sense device 3 of the stimulus generating unit 24 to operate on the basis of a control signal received from the communicating device 13.

For example, the control unit 27 adjusts the amount of sliding of the slide member 6 in the first rotational direction +D1 on the basis of a result of detection by the tactile sensor 117 of the puppet operating device 11. The control unit 27 thereby adjusts the pressing force acting on the finger F. For example, the control unit 27 adjusts the amount of sliding of the slide member 6 on the basis of the control signal received from the communicating device 13 according to the result of detection by the tactile sensor 117. The control unit 27 thus adjusts the pressing force against the finger F inserted in the opening portion 41 of the fitting member 4, that is, the finger F fitted with the pressure sense device 3. At this time, the control unit 27 individually controls each of the plurality of pressure sense devices 3 (31 to 35) provided to the operating device 2, thereby causing each of the pressure sense devices 31 to 35 to individually operate.

Incidentally, in a case where the pressing portion 84 of the protruding member 8 is provided with a pressure sensor, for example, the control unit 27 may adjust the amount of sliding of the slide member 6 on the basis of a result of detection by the pressure sensor.

In addition, the control of the operation of the pressure sense device 3, that is, the control of the operation of the driving device 5, which control is performed by the control unit 27, may be performed by the control board 54.

Effects of First Embodiment

The operating system 1 according to the present embodiment described above produces the following effects.

The operating device 2 includes the pressure sense device 3.

The pressure sense device 3 includes the fitting member 4 in a tubular shape, the driving device 5, the slide member 6, and the protruding member 8. The driving device 5 causes the slide member 6 to slide. The slide member 6 is provided in such a manner as to be slidable in the first rotational direction +D1 about the central axis of the fitting member 4 and the opposite direction −D1 from the first rotational direction +D1 along the outer circumferential surface 4S of the fitting member 4. The protruding member 8 protrudes into the inside of the fitting member 4 as the slide member 6 slides in the first rotational direction +D1.

According to such a configuration, the protruding member 8 can press the finger F of the user inserted within the fitting member 4. The finger F of the user corresponds to a part of the body of the user.

At this time, the protruding member 8 protrudes into the inside of the fitting member 4 as the slide member 6 slides in the first rotational direction +D1. According to this, an amount of protrusion of the protruding member 8 into the inside of the fitting member 4 can be adjusted by adjusting an amount of sliding of the slide member 6 in the first rotational direction +D1. It is therefore possible to adjust the pressing force against the finger F disposed within the fitting member 4. Hence, it is possible to configure a pressure sense device 3 that can adjust the pressing force against the finger F of the user.

In the pressure sense device 3, the protruding member 8 includes the hinge portions 82, the contact portion 83, and the pressing portion 84. The hinge portions 82 are rotatably supported by the supporting portions 47 of the fitting member 4. The contact portion 83 is disposed in the first rotational direction +D1 with respect to the hinge portions 82, and is in contact with the slide member 6. The pressing portion 84 is inserted into the inside of the fitting member 4 when the abutment portion 62 of the slide member 6 slides in the first rotational direction +D1 in a state of being in contact with the contact portion 83.

According to such a configuration, when the slide member 6 in contact with the contact portion 83 slides in the first rotational direction +D1, the protruding member 8 can be rotated about the hinge portions 82 in a direction of protruding into the inside of the fitting member 4. Thus, the finger F disposed within the fitting member 4 can be pressed by the pressing portion 84.

In the pressure sense device 3, the dimension between the contact portion 83 and the pressing portion 84 is increased toward the first rotational direction +D1. Specifically, a length between a surface of the contact portion 83 with which surface the abutment portion 62 of the slide member 6 is in contact and a surface of the pressing portion 84 which surface faces the inside of the fitting member 4 is increased toward the first rotational direction +D1.

According to such a configuration, the pressing portion 84 can be caused to protrude into the inside of the fitting member 4 as the slide member 6 in contact with the contact portion 83 slides in the first rotational direction +D1. Hence, it is possible to cause the pressing portion 84 to protrude into the inside of the fitting member 4 according to the amount of sliding of the slide member 6, and in turn, adjust the pressing force against the finger F by the pressing portion 84.

In the pressure sense device 3, the fitting member 4 has the notch 44 that straddles one end of the fitting member 4 and another end of the fitting member 4 in the +Z direction along the central axis of the fitting member 4. That is, the fitting member 4 has the notch 44 that connects an end portion in the +Z direction and an end portion in the −Z direction to each other. The +Z direction corresponds to a first direction.

According to such a configuration, the inside diameter of the fitting member 4 can be increased according to the outside diameter of the finger F inserted into the inside of the fitting member 4. Hence, the fitting member 4 can be made to fit the finger F. In addition, the pressure sense device 3 can be fitted to a plurality of positions having different outside diameters in a human body. For example, the pressure sense device 3 can be fitted to each finger F. In addition, even in a case where another user is fitted with the pressure sense device 3, the fitting member 4, and in turn the pressure sense device 3, can be made to fit the finger F of the other user.

In the pressure sense device 3, the fitting member 4 has the recessed portion 48 that is recessed in the first rotational direction +D1 from the end edge 46 in the first rotational direction +D1 among the end edges 45 and 46 of the notch 44. A part in the first rotational direction +D1 in the protruding member 8 is disposed within the recessed portion 48.

According to such a configuration, the protruding member 8 can be disposed such that the part in the first rotational direction +D1 in the protruding member 8, that is, a part on an opposite side from the hinge portions 82 in the protruding member 8 does not interfere with the fitting member 4. Hence, it is possible to not only facilitate the protrusion of the pressing portion 84 into the inside of the fitting member 4 but also form the protruding member 8 in a large size and consequently increase the amount of protrusion of the pressing portion 84 into the inside of the fitting member 4.

In the pressure sense device 3, the fitting member 4 includes the fixing portion 42 that projects in the +Y direction from the outer circumferential surface 4S of the fitting member 4 and to which the driving device 5 is fixed. The notch 44 is disposed on an opposite side from the fixing portion 42 in the fitting member 4. Specifically, the notch 44 is provided on an opposite side of the center of the fitting member 4 from the fixing portion 42 as viewed from the +Z direction along the central axis of the fitting member 4.

According to such a configuration, the driving device 5 can be fixed to the fitting member 4, and therefore, a driving force of the driving device 5 can be easily transmitted to the slide member 6 that slides along the outer circumferential surface 4S of the fitting member 4. In addition, because a part of the protruding member 8 is disposed in the notch 44, the driving device 5 and the protruding member 8 are provided to parts on opposite sides from each other in the fitting member 4. It is therefore possible to facilitate attachment of the driving device 5 and the protruding member 8 to the fitting member 4.

The pressure sense device 3 includes the guide member 7 attached to the outer circumferential surface 4S of the fitting member 4. The fitting member 4 has the guide portion 43 that is provided to the outer circumferential surface 4S of the fitting member 4, and guides the sliding of the slide member 6. The guide member 7 and the guide portion 43 sandwich the slide member 6.

According to such a configuration, it is possible to facilitate the sliding of the slide member 6 along the outer circumferential surface 4S of the fitting member 4. In addition, because the slide member 6 is disposed between the guide member 7 and the guide portion 43, it is possible to suppress detachment of the slide member 6 from the fitting member 4.

In the pressure sense device 3, the fitting member 4 has the holding portion 49 that protrudes to the inside of the fitting member 4 from a position on an opposite side from the protruding member 8 on the inner surface of the fitting member 4. Specifically, as viewed from the +Z direction along the central axis of the fitting member 4, the holding portion 49 protrudes from a position on the inner surface of the fitting member 4 which position is in an opposite direction (+Y direction) from a direction (−Y direction) in which the protruding member 8 is provided with respect to the center of the fitting member 4.

According to such a configuration, the holding portion 49 comes into contact with the finger F inserted within the fitting member 4. It is thus possible to suppress the rocking of the finger F within the fitting member 4.

In addition, because a part of the protruding member 8 protrudes into the inside of the fitting member 4 in a state in which the holding portion 49 is in contact with the finger F, the protruding member 8 can be made to come into contact with the finger F easily. Hence, it is possible to facilitate applying the pressing force to the finger F.

The operating device 2 includes the glove 21 that is fitted to the one hand UH of the user, and which includes the finger portions 211 to 215 into which the fingers F of the user are inserted. The pressure sense devices 3 are provided to the finger portions 211 to 215.

According to such a configuration, it is possible to configure an operating device 2 that facilitates fitting the fingers F with the pressure sense devices 3.

The operating device 2 includes the plurality of pressure sense devices 3 (31 to 35) and the control unit 27 that individually controls each of the plurality of pressure sense devices 3 (31 to 35).

According to such a configuration, pressure senses can be individually given to parts provided with the plurality of pressure sense devices 3 in the body of the user. In the present embodiment, the plurality of pressure sense devices 3 can individually give pressure senses to the fingers F (F1 to F5) of the user. Hence, versatility of the operating device 2 can be enhanced.

Second Embodiment

A second embodiment of the present invention will next be described.

An operating system according to the present embodiment has a configuration similar to that of the operating system 1 according to the first embodiment. However, the pressure sense devices included in the operating device 2 have a different configuration. Specifically, the pressure sense devices according to the present embodiment are different from the pressure sense devices according to the first embodiment in that the pressure sense devices according to the present embodiment further include a converting member that converts the sliding of the slide member into linear movement of the protruding member. Incidentally, in the following description, parts identical to or substantially identical to the already described parts are identified by the same reference numerals, and description thereof will be omitted.

[Configuration of Operating System]

Figure 10:
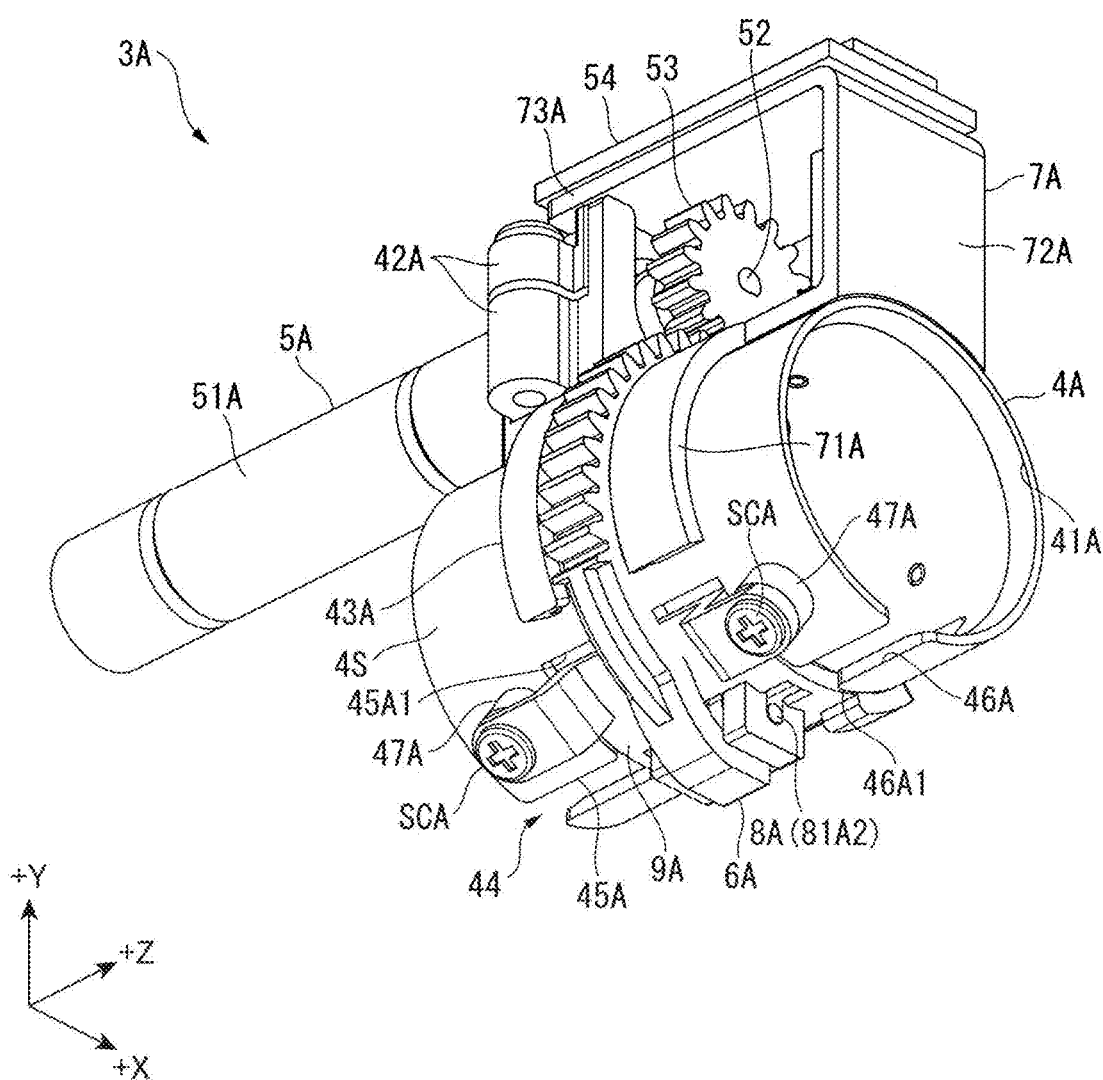
FIG. 10 is a perspective view illustrating a pressure sense device included in an operating device of an operating system in a second embodiment.
Figure 11:
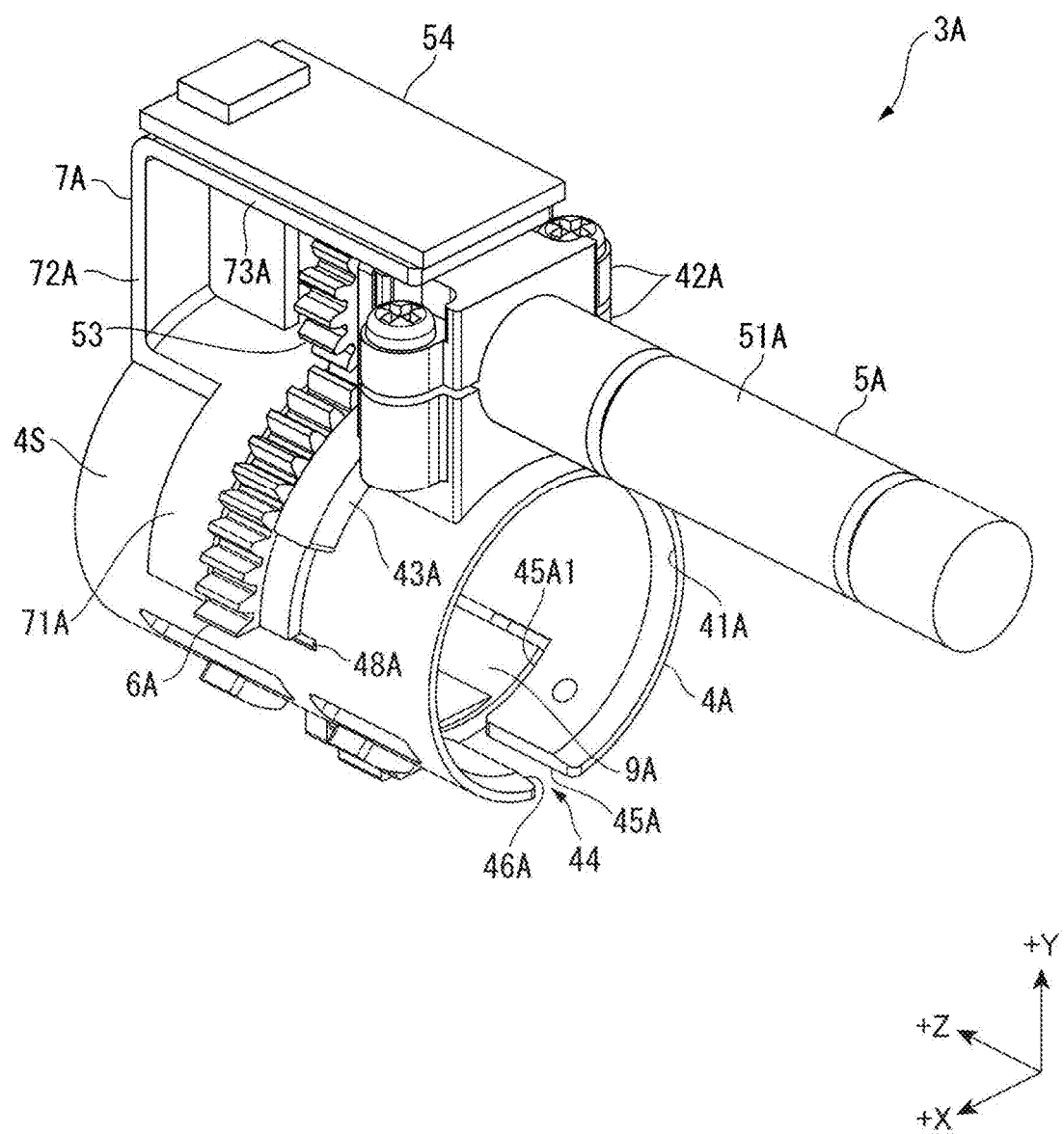
FIG. 11 is a perspective view illustrating the pressure sense device in the second embodiment.

FIG. 10 and FIG. 11 are perspective views illustrating a pressure sense device 3A included in the operating device 2 of the operating system according to the present embodiment. Specifically, FIG. 10 is a perspective view illustrating the pressure sense device 3A as viewed from the −Y direction, and FIG. 11 is a perspective view illustrating the pressure sense device 3A as viewed from the +Y direction.

The operating system according to the present embodiment has a configuration and functions similar to those of the operating system 1 according to the first embodiment except that the operating system according to the present embodiment includes the pressure sense device 3A illustrated in FIG. 10 and FIG. 11 in place of the pressure sense device 3. That is, the operating device 2 according to the present embodiment includes a plurality of pressure sense devices 3A in place of the plurality of pressure sense devices 3. The plurality of pressure sense devices 3A are respectively provided so as to correspond to the respective fingers F1 to F5 as in the case of the plurality of pressure sense devices 3 according to the first embodiment.

[Configuration of Pressure Sense Device]

As with the pressure sense device 3, the pressure sense device 3A gives a pressure sense to the finger F of the user fitted with the pressure sense device 3A under control of the control unit 27. The pressure sense device 3A includes a fitting member 4A, a driving device 5A, a slide member 6A, a guide member 7A, a protruding member 8A, and a converting member 9A.

[Configuration of Fitting Member]

The fitting member 4A is formed in a tubular shape as in the case of the fitting member 4. The finger F of the user is inserted into the inside of the fitting member 4A along the +Z direction. That is, the fitting member 4A has an opening portion 41A that penetrates the fitting member 4 along the +Z direction and into which the finger F is inserted.

Figure 12:
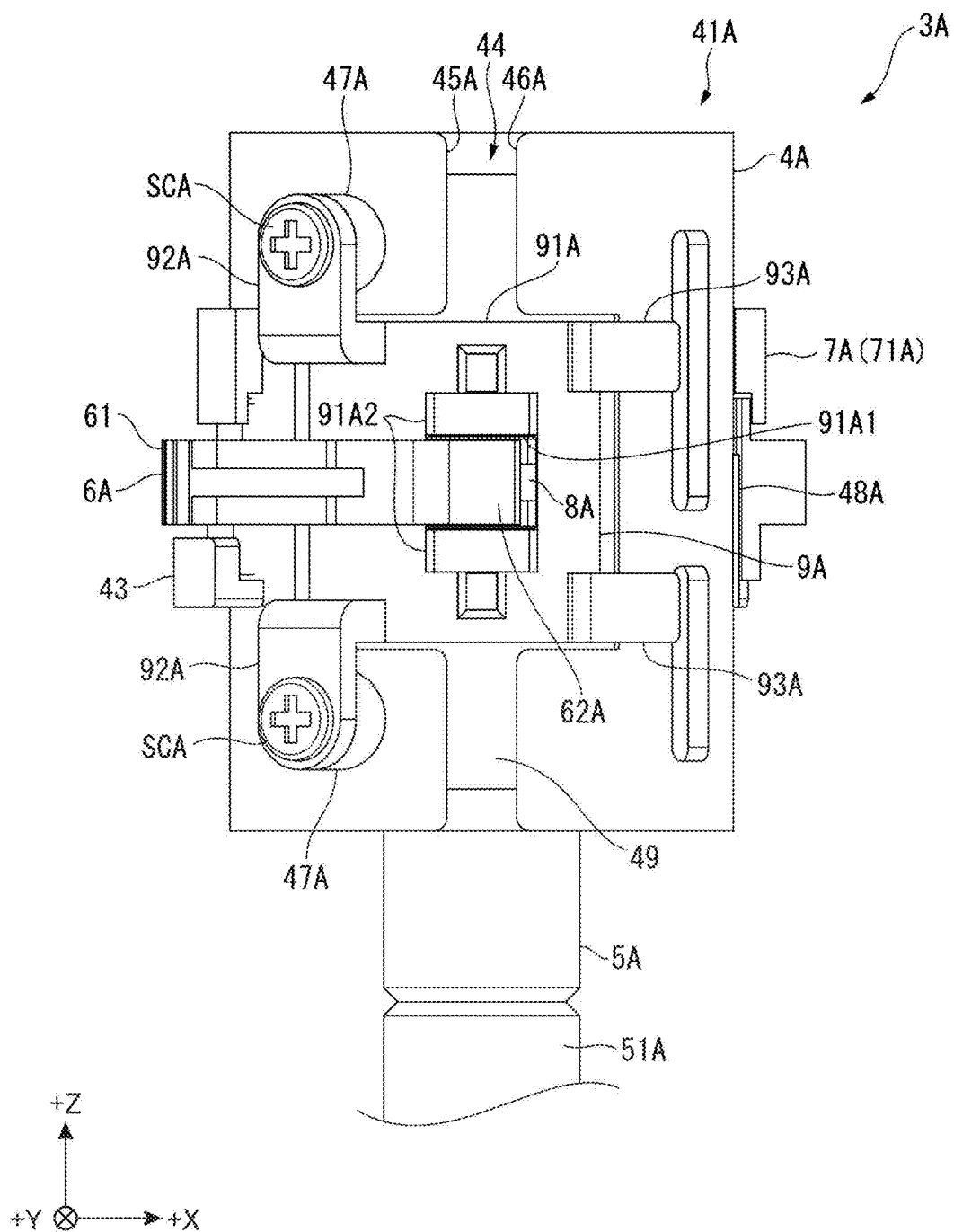
FIG. 12 is a view illustrating the pressure sense device in the second embodiment.

In addition, the fitting member 4A includes a fixing portion 42A, a guide portion 43A, a notch 44, end edges 45A and 46A, supporting portions 47A, a regulating portion 48A, and a holding portion 49 (see FIG. 12).

The fixing portion 42A sandwiches a driving device main body 51A in the +Y direction.

The guide portion 43A has a configuration and functions similar to those of the guide portion 43 according to the first embodiment except that the guide portion 43A does not include the regulating portion 431.

FIG. 12 is a view illustrating the pressure sense device 3A as viewed from the −Y direction.

A distance between the end edges 45A and 46A of the fitting member 4 separated from each other by the notch 44, that is, between the end edge 45 in the −X direction and the end edge 46 in the +X direction is increased when the finger is inserted into the opening portion 41. That is, the fitting member 4A has such flexibility that the inside diameter of the opening portion 41 can be increased. Thus, the fitting member 4A fits the inserted finger F.

As illustrated in FIG. 12, of the end edges 45A and 46A facing each other in the +X direction, the end edge 45A in the −X direction has a recessed portion 45A1 recessed in the −X direction of separating from the end edge 46A, and the end edge 46A in the +X direction has a recessed portion 46A1 recessed in the +X direction of separating from the end edge 45A. A part of the converting member 9A to be described later is disposed within the recessed portions 45A1 and 46A1.

The supporting portions 47A are provided to parts in the −Y direction in the outer circumferential surface 4S. Specifically, the supporting portions 47 are disposed at a position on a clockwise side with respect to the end edge 45A as viewed from the +Z direction. The supporting portions 47A support the converting member 9A to be described later. In other words, the converting member 9A is attached to the supporting portions 47A by screws SCA.

As illustrated in FIG. 11, the regulating portion 48A is provided in such a manner as to protrude from the outer circumferential surface 4S. The regulating portion 48A is in contact with an end portion of the slide member 6A, and regulates the sliding of the slide member 6A in the clockwise direction as viewed from the +Z direction. That is, the regulating portion 48A defines one end of a sliding range of the slide member 6A.

[Configuration of Driving Device]

As with the driving device 5, the driving device 5A the causes slide member 6A to slide along the outer circumferential surface 4S of the fitting member 4A. As illustrated in FIG. 10 and FIG. 11, the driving device 5A includes a driving device main body 51A, a rotor 52, a pinion 53, and a control board 54.

The driving device main body 51A is fixed to the fixing portion 42A. The driving device main body 51A is a motor that causes the rotor 52, to which the pinion 53 is attached, to rotate about a rotational axis along the +Z direction.

In the present embodiment, the control board 54 is disposed separated from the driving device main body 51A. Specifically, the control board 54 is disposed on a surface in the +Y direction on the guide member 7A.

[Configuration of Slide Member]

Figure 13:
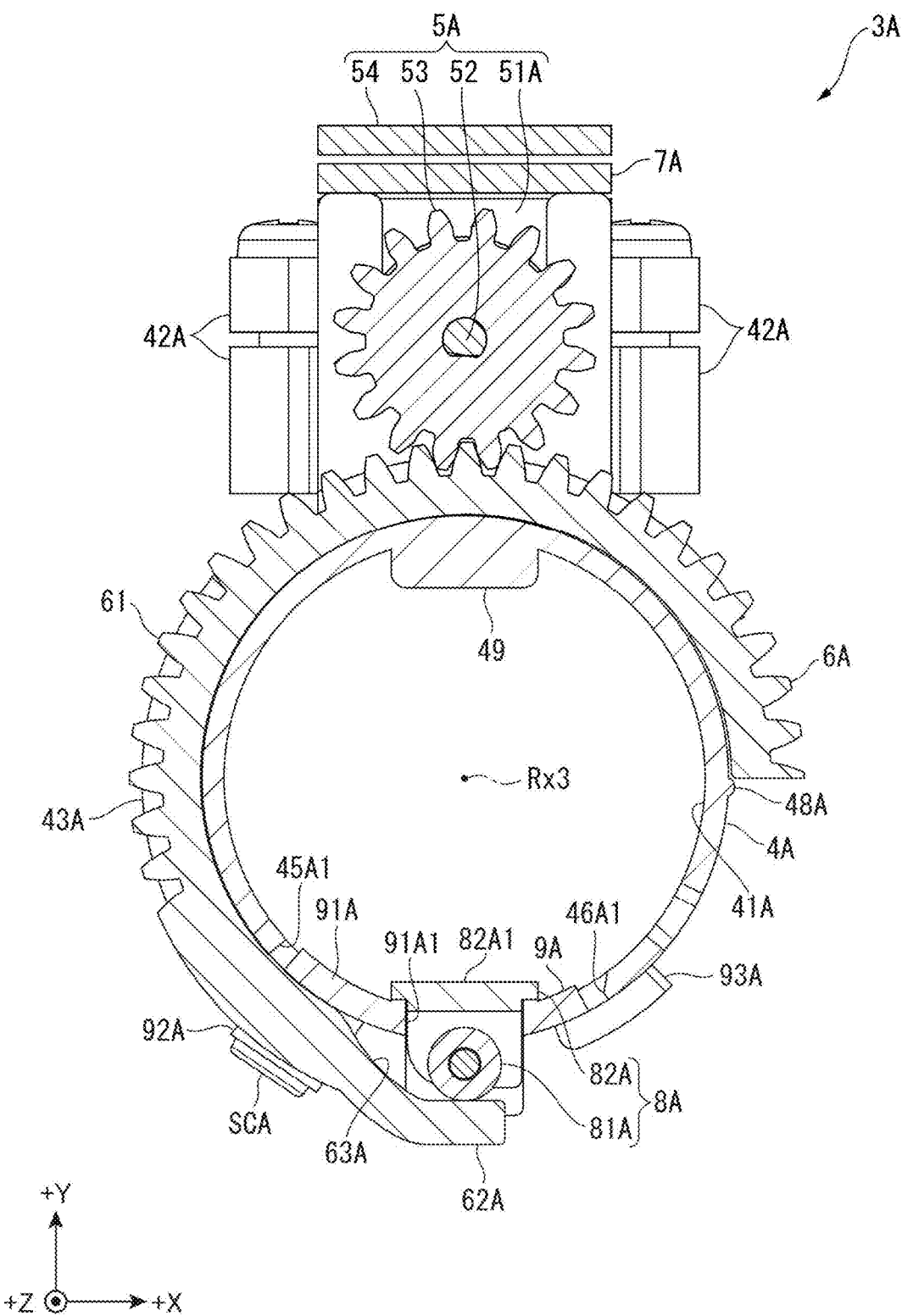
FIG. 13 is a sectional view illustrating the pressure sense device in the second embodiment.

FIG. 13 is a view, as viewed from the +Z direction, of a section of the pressure sense device 3A along an XY plane at an arrangement position of the slide member 6A.

As illustrated in FIG. 13, the slide member 6A is formed in an arcuate shape about substantially the center of the opening portion 41A as viewed from the +Z direction. In other words, the slide member 6A is formed in an arcuate shape along the outer circumferential surface 4S of the fitting member 4A. The slide member 6A is attached to the fitting member 4A in such a manner as to be slidable along the outer circumferential surface 4S about a rotational axis Rx3 along the +Z direction. That is, the slide member 6A is rotatable along the outer circumferential surface 4S and about the rotational axis Rx3. The slide member 6A is formed with such a dimension as to cover ¾ of the outer circumferential surface 4S as viewed from the +Z direction. The slide member 6A includes a rack 61 provided to the outer circumferential surface of the slide member 6A and an abutment portion 62A provided to the inner circumferential surface of the slide member 6A.

The abutment portion 62A is provided to an end portion of the slide member 6A in a counterclockwise direction about the rotational axis Rx3 as viewed from the +Z direction. The abutment portion 62A abuts against a roller portion 81A1 (see FIG. 16 and FIG. 17), which will be described later, of the protruding member 8A, and makes the protruding member 8A protrude into the inside of the opening portion 41 according to the slide position of the slide member 6A.

The abutment portion 62A has an abutment surface 63A against which the roller portion 81A1 abuts in the inner circumferential surface of the abutment portion 62A. The abutment surface 63A intersects the outer circumferential surface 4S. Specifically, the abutment surface 63A is inclined in a direction of approaching the outer circumferential surface 4S toward a clockwise direction about the rotational axis Rx2 as viewed from the +Z direction. In other words, the abutment surface 63A is inclined in a direction of separating from the outer circumferential surface 4S toward a counterclockwise direction (first rotational direction +D1) about the rotational axis Rx2 as viewed from the +Z direction. That is, the abutment surface 63A is inclined in a direction of separating from the outer circumferential surface 4S toward the rotational direction (first rotational direction +D1) of the slide member 6A at the time of protrusion of the protruding member 8A into the inside of the fitting member 4A.

Therefore, as will be described later in detail, when the slide member 6A is rotated in the first rotational direction +D1, the abutment portion 62A presses the roller portion 81A1 in the +Y direction.

Incidentally, the slide member 6A has such flexibility that the slide member 6A is displaceable according to a displacement of the fitting member 4A, which is increased in diameter when the finger F is inserted thereinto.

[Configuration of Guide Member]

As illustrated in FIG. 10 and FIG. 11, the guide member 7A is attached to an opposite side of the slide member 6A from the guide portion 43 on the outer circumferential surface 4S. That is, the guide member 7A is attached in the +Z direction with respect to the slide member 6A on the outer circumferential surface 4S. The guide member 7A includes a sandwiching portion 71A, a protecting portion 72A, and an attaching portion 73A.

As with the guide portion 43, the sandwiching portion 71A is formed in an arcuate shape along the outer circumferential surface 4S. The sandwiching portion 71A and the guide portion 43 sandwich the slide member 6A therebetween when the guide member 7A is attached to the outer circumferential surface 4S. Thus, the sliding of the slide member 6A is guided, and the falling of the slide member 6A off the fitting member 4A in the +Z direction is suppressed.

The protecting portion 72A is a part that extends in the +Z direction from the sandwiching portion 71A, then bends in the +Y direction, and further extends in the -Z direction. The protecting portion 72A covers the pinion 53 as viewed from the +Z direction and the +Y direction, and thus protects the pinion 53 and the rotor 52.

The attaching portion 73A is provided to a surface facing in the +Y direction on the protecting portion 72A. The control board 54 is disposed on the attaching portion 73A.

[Configuration of Converting Member]

Figure 14:
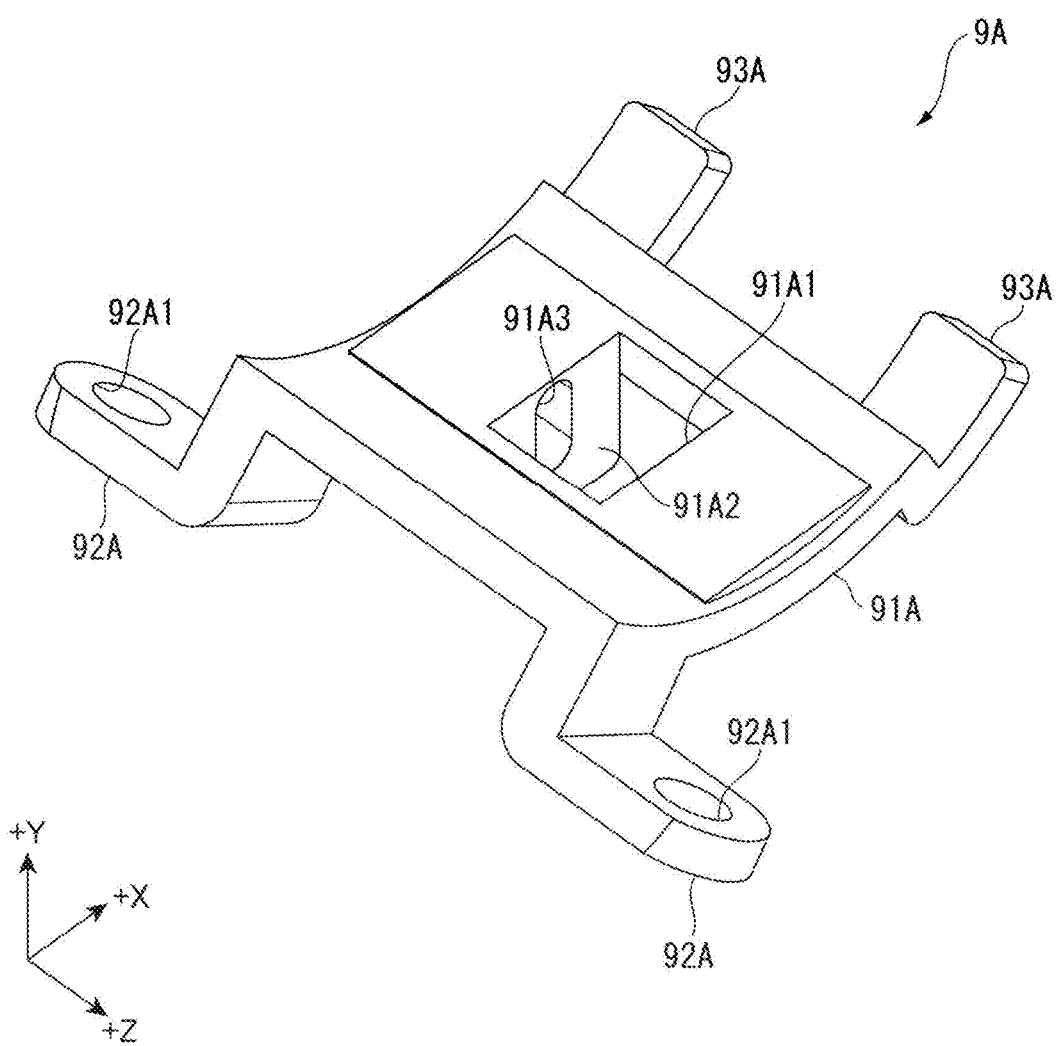
FIG. 14 is a perspective view illustrating a converting member in the second embodiment.
Figure 15:
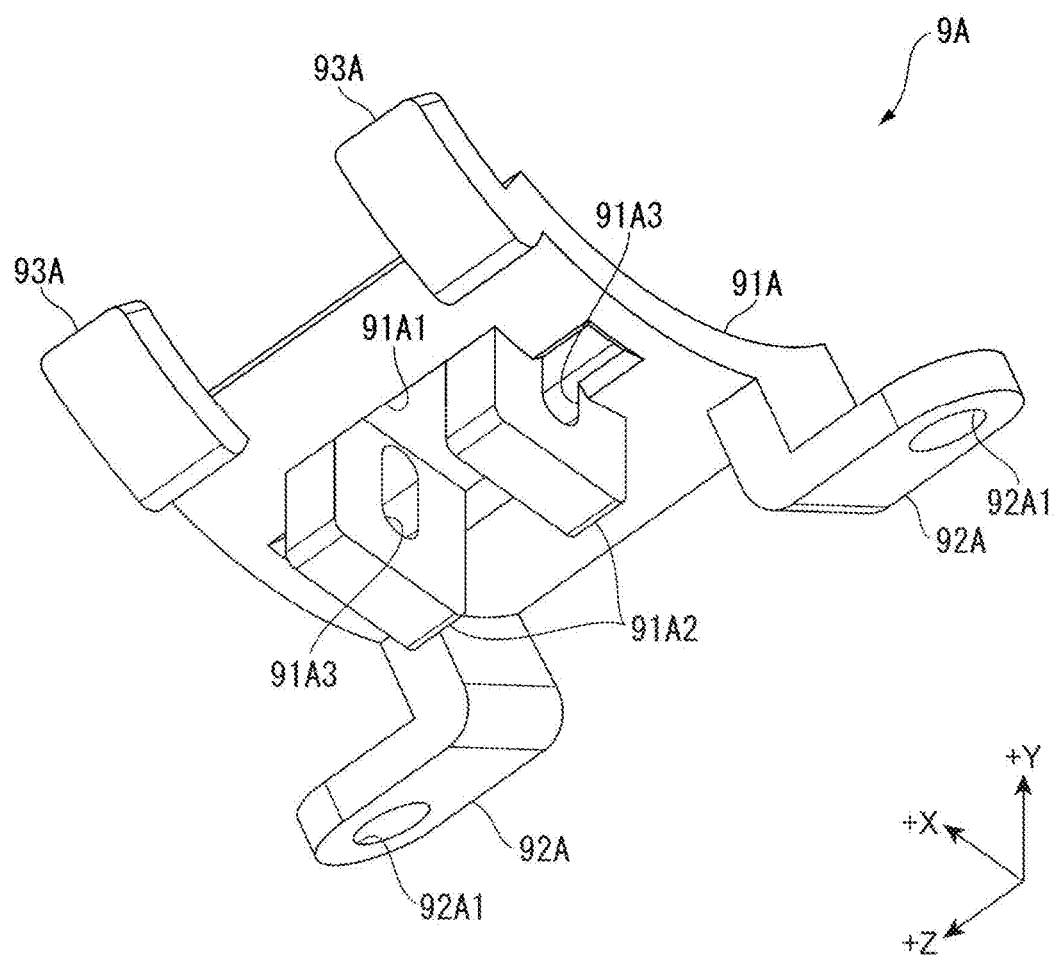
FIG. 15 is a perspective view illustrating the converting member in the second embodiment.

FIG. 14 and FIG. 15 are perspective views illustrating the converting member 9A. Specifically, FIG. 14 is a perspective view of the converting member 9A as viewed from the +Y direction, and FIG. 15 is a perspective view of the converting member 9A as viewed from the -Y direction.

The converting member 9A will be described prior to the protruding member 8A.

The converting member 9A is fixed to the outer circumferential surface 4S of the fitting member 4A. The converting member 9A converts the rotation of the slide member 6A about the rotational axis Rx3 into rectilinear motion of the protruding member 8A to one of the inside and the outside of the fitting member 4A. That is, the converting member 9A converts the rotation of the slide member 6A about the rotational axis Rx3 into movement of the protruding member 8A along a radial direction having the rotational axis Rx3 as a center.

As illustrated in FIG. 14 and FIG. 15, the converting member 9A includes a main body portion 91A, a pair of fixing portions 92A, and a pair of regulating portions 93A.

The main body portion 91A is formed in a substantially rectangular shape as viewed from the +Y direction. The main body portion 91A is disposed inside the recessed portions 45A1 and 46A1 when the converting member 9A is fixed to the fitting member 4A. The main body portion 91A includes an opening portion 91A1, a pair of projecting portions 91A2, and a pair of guide holes 91A3.

The opening portion 91A1 is formed in a rectangular shape as viewed from the +Y direction, and penetrates the main body portion 91A along the +Y direction. The protruding member 8A is disposed within the opening portion 91A1.

The pair of projecting portions 91A2 projects in the -Y direction from an inner edge in the +Z direction and an inner edge in the -Z direction among inner edges of the opening portion 91A1.

The pair of guide holes 91A3 is provided in the pair of projecting portions 91A2. Specifically, of the pair of guide holes 91A3, one guide hole 91A3 is provided to the projecting portion 91A2 in the +Z direction, and the other guide hole 91A3 is provided to the projecting portion 91A2 in the −Z direction. Each of the guide holes 91A3 is an elongated hole having a long diameter in the +Y direction. The +Y direction is a movement direction of the protruding member 8A to the inside of the fitting member 4A.

A rotary shaft portion 81A2, which will be described later, of the protruding member 8A is inserted within each of the guide holes 91A3. Incidentally, the short diameter of the guide hole 91A3, that is, the inside diameter along the +X direction of the guide hole 91A3 is a value obtained by adding a slight clearance to the outside diameter of the rotary shaft portion 81A2.

The pair of fixing portions 92A is provided to an end portion in the −X direction in the main body portion 91A. Specifically, of the pair of fixing portions 92A, one fixing portion 92A extends in the +Z direction from an end portion in the −X direction and the +Z direction in the main body portion 91A, and the other fixing portion 92A extends in the −Z direction from an end portion in the −X direction and the −Z direction in the main body portion 91A. Each of the fixing portions 92A is provided with a hole portion 92A1. A screw SCA is inserted into the hole portion 92A1 in the +Y direction. The screws SCA inserted into the respective hole portions 92A1 are fixed to the supporting portions 47A in a state in which the main body portion 91A is disposed inside the recessed portions 45A1 and 46A1. The converting member 9A is thus fixed to the outer circumferential surface 4S.

The pair of regulating portions 93A is provided to an end portion in the +X direction in the main body portion 91A. Specifically, of the pair of regulating portions 93A, one regulating portion 93A extends in the +X direction from an end portion in the +X direction and the +Z direction in the main body portion 91A, and the other regulating portion 93A extends in the +X direction from an end portion in the +X direction and the −Z direction in the main body portion 91A.

The pair of regulating portions 93A faces the outer circumferential surface 4S when the converting member 9A is attached to the fitting member 4A. When the fitting member 4A is increased in diameter, the pair of regulating portions 93A regulates an excessive increase in diameter of the fitting member 4A by being in contact with the outer circumferential surface 4S. In addition, the pair of regulating portions 93A regulates movement of the converting member 9A in the +Y direction together with the protruding member 8A by being in contact with the outer circumferential surface 4S.

[Configuration of Protruding Member]

Figure 16:
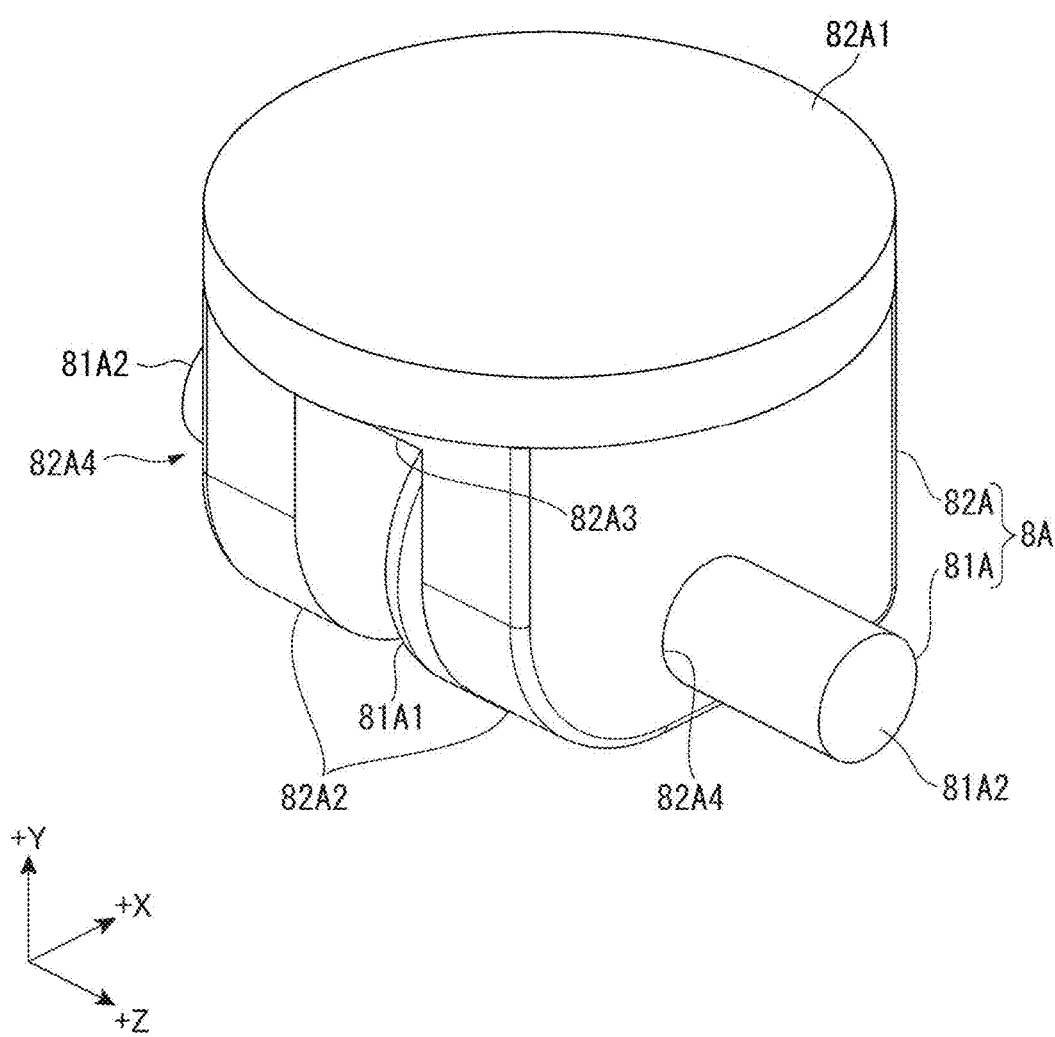
FIG. 16 is a perspective view illustrating a protruding member in the second embodiment.
Figure 17:
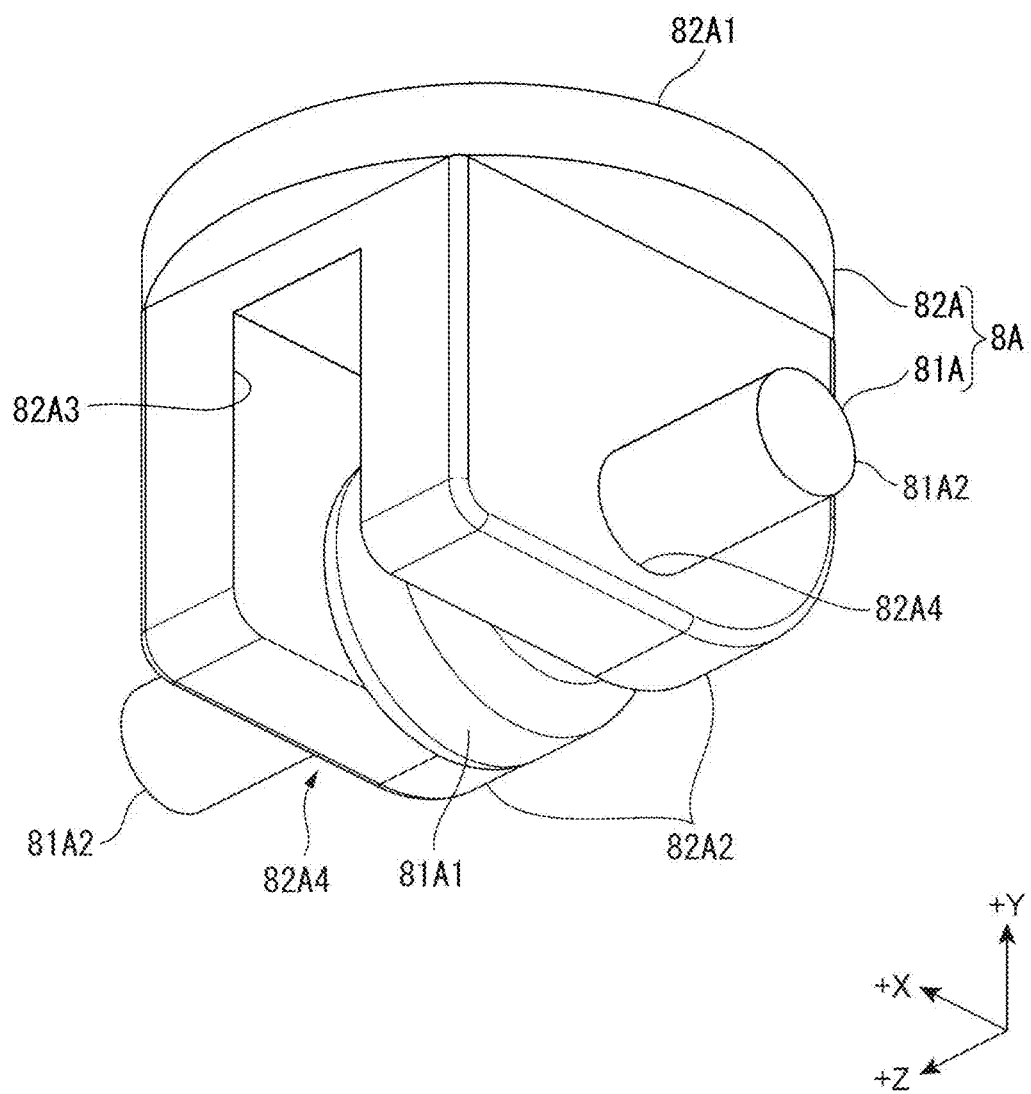
FIG. 17 is a perspective view illustrating the protruding member in the second embodiment.

FIG. 16 and FIG. 17 are perspective views illustrating the protruding member 8A. Specifically, FIG. 16 is a perspective view illustrating the protruding member 8A as viewed from the +Y direction, and FIG. 17 is a perspective view illustrating the protruding member 8A as viewed from the −Y direction.

As with the protruding member 8 according to the first embodiment, the protruding member 8A is a pressing piece that is moved to the inside or outside of the fitting member 4A as the slide member 6A slides, and which presses the finger F of the user when inserted into the inside of the fitting member 4A. As illustrated in FIG. 13, the protruding member 8A is disposed within the opening portion 91A1 of the converting member 9A. As illustrated in FIG. 16 and FIG. 17, the protruding member 8A includes a roller member 81A and an insertion member 82A that are combined with each other.

The roller member 81A is rotatably supported by the insertion member 82A, and is rotated while in contact with the slide member 6A. The roller member 81A includes a roller portion 81A1 and a pair of rotary shaft portions 81A2.

The roller portion 81A1 is formed in a disk shape. The roller portion 81A1 is in contact with the abutment portion 62A of the slide member 6A, and rotates about the rotary shaft portions 81A2 as the slide member 6A slides. That is, the roller portion 81A1 is a contact portion in the protruding member 8A which contact portion is in contact with the slide member 6A.

The pair of rotary shaft portions 81A2 forms a rotational axis of the roller portion 81A1. Of the pair of rotary shaft portions 81A2, one rotary shaft portion 81A2 projects in the +Z direction from the center of a surface in the +Z direction on the roller portion 81A1, and the other rotary shaft portion 81A2 projects in the −Z direction from the center of a surface in the −Z direction on the roller portion 81A1. That is, the roller portion 81A1 is rotatable about the rotational axis along the +Z direction.

The insertion member 82A not only supports the roller member 81A rotatably but also presses the finger F of the user by being inserted into the inside of the fitting member 4A. The insertion member 82A includes a pressing portion 82A1 and a pair of supporting portions 82A2.

The pressing portion 82A1 is a part facing in the +Y direction in the protruding member 8A. The pressing portion 82A1 presses the finger F of the user. In the present embodiment, a surface of the pressing portion 82A1 which surface is oriented in the +Y direction and faces the finger F of the user is a flat surface. However, without being limited to this, the surface of the pressing portion 82A1 oriented in the +Y direction may be, for example, a curved surface whose central part protrudes in the +Y direction.

The pair of supporting portions 82A2 supports the roller member 81A. The pair of supporting portions 82A2 extends in the −Y direction from a part in the +Z direction and a part in the −Z direction in the pressing portion 82A1. In other words, the insertion member 82A has an arrangement portion 82A3 that is provided between the pair of supporting portions 82A2 and in which the roller portion 81A1 is disposed.

Each of the pair of supporting portions 82A2 has a through hole 81A4 that penetrates the supporting portion 82A2 along the +Z direction. The rotary shaft portions 81A2 are inserted into the respective through holes 82A4. Specifically, the rotary shaft portion 81A2 in the +Z direction is inserted through the through hole 82A4 possessed by the supporting portion 82A2 in the +Z direction among the pair of supporting portions 82A2, and the rotary shaft portion 81A2 in the −Z direction is inserted through the through hole 82A4 possessed by the supporting portion 82A2 in the −Z direction among the pair of supporting portions 82A2. Hence, the roller member 81A is supported by the insertion member 82A in such a manner as to be rotatable about the rotational axis along the +Z direction.

Incidentally, the rotary shaft portion 81A2 in the +Z direction inserted through the through hole 82A4 is inserted into the guide hole 91A3 (FIG. 15) in the +Z direction, and the rotary shaft portion 81A2 in the −Z direction inserted through the through hole 82A4 is inserted into the guide hole 91A3 (FIG. 15) in the −Z direction. As described above, the long diameter of the guide holes 91A3 is along the +Y direction, and the short diameter of the guide holes 91A3 along the +X direction is slightly larger than the outside diameter of the rotary shaft portions 81A2. Therefore, movement of the protruding member 8A in the ±X direction is regulated, while movement of the protruding member 8A in the ±Y direction is permitted.

[Operation of Pressure Sense Device]

Figure 18:
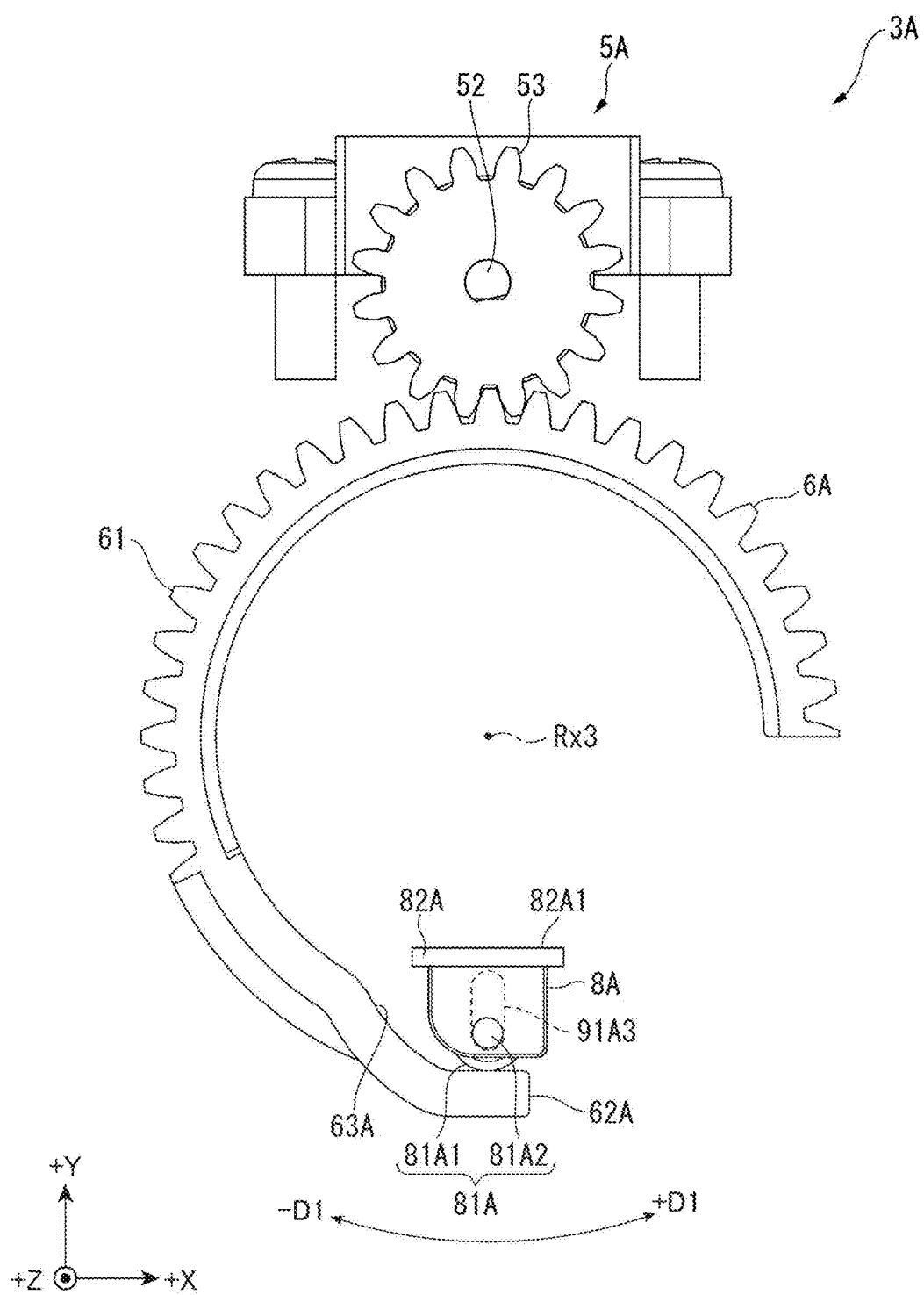
FIG. 18 is a view illustrating a slide member and the protruding member in the second embodiment.

FIG. 18 is a view of the slide member 6A as viewed from the +Z direction when the protruding member 8A is located farthest in the −Y direction. Incidentally, FIG. 18 does not illustrate a part of the configuration possessed by the pressure sense device 3A.

In the following, operation of the pressure sense device 3A will be described.

When the pinion 53 is rotated and the slide member 6A is rotated in the first rotational direction +D1 about the rotational axis Rx3 from a position illustrated in FIG. 18, the abutment portion 62A of the slide member 6A abuts against the roller portion 81A1 of the protruding member 8A.

Here, as described above, the protruding member 8A is disposed within the opening portion 91A1 of the converting member 9A fixed to the fitting member 4A. In addition, the rotary shaft portions 81A2 constituting the rotational axis of the roller portion 81A1 are inserted in the guide holes 91A3 of the converting member 9A. Hence, movement in the ±X direction of the protruding member 8A and movement in the ±Z direction of the protruding member 8A are regulated.

Figure 19:
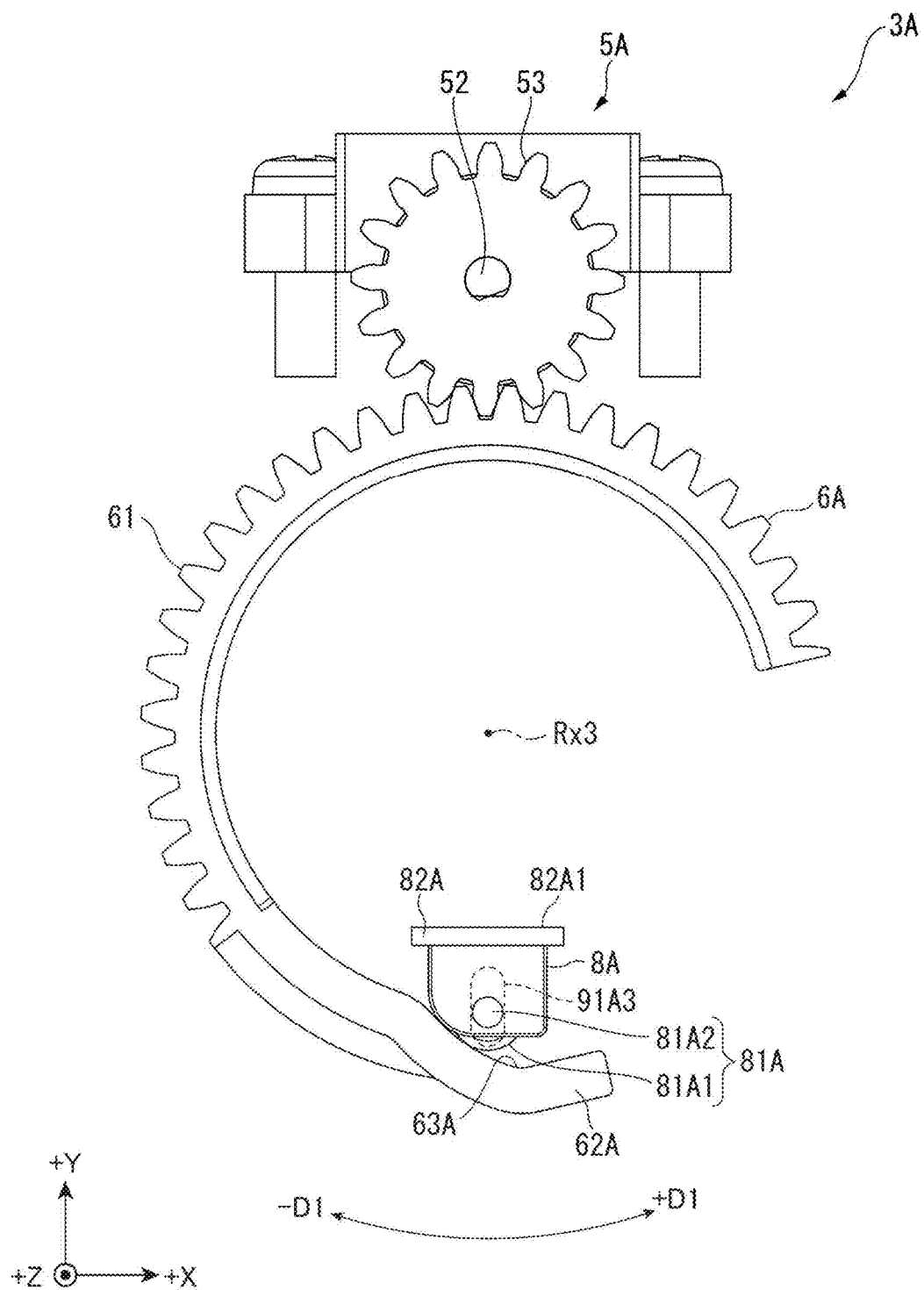
FIG. 19 is a view illustrating the slide member and the protruding member in the second embodiment.

FIG. 19 is a view of the slide member 6A as viewed from the +Z direction when the protruding member 8A is moved in the +Y direction from the state of FIG. 18. Incidentally, FIG. 19 also does not illustrate a part of the configuration possessed by the pressure sense device 3A.

Therefore, when the slide member 6A is further rotated in the first rotational direction +D1, the roller portion 81A1 is moved in the +Y direction by the abutment surface 63A while rotating along the abutment surface 63A inclined with respect to the outer circumferential surface 4S, as illustrated in FIG. 19. The protruding member 8A is thus moved in the +Y direction.

Then, though not illustrated in the figure, when the slide member 6A is further rotated in the first rotational direction +D1, the protruding member 8A is moved in the +Y direction in a range until the rotary shaft portions 81A2 come into contact with parts in the +Y direction in the inner surfaces of the guide holes 91A3.

Thus, an amount of insertion of the pressing portion 82A1 into the inside of the fitting member 4A changes according to an amount of sliding of the slide member 6A. Consequently, not only can the surface of the pressing portion 82A1 formed in a planar shape press the finger F of the user inserted within the fitting member 4A, but also the pressing force against the finger F of the user can be adjusted by adjusting the amount of sliding of the slide member 6A.

Incidentally, when the slide member 6A is rotated in the opposite direction −D1 about the rotational axis Rx3 from a state in which the protruding member 8A has moved in the +Y direction, the roller portion 81A1 is moved in the −Y direction in a state of being in contact with the abutment surface 63A. The protruding member 8A is thus moved in the −Y direction. Then, when the slide member 6A is returned to the position before being rotated in the first rotational direction D1, the protruding member 8A is moved to the position illustrated in FIG. 18. That is, the protruding member 8A is moved to a position at which the rotary shaft portions 81A2 are in contact with parts in the −Y direction in the inner surfaces of the guide holes 91A3. Consequently, the amount of insertion of the pressing portion 82A1 into the inside of the fitting member 4A is decreased, and the pressing portion 82A1 is separated from the finger F.

Thus, the pressure sense device 3A can not only switch between a case of applying the pressing force to the finger F and a case of not applying the pressing force to the finger F according to the rotational direction and the rotational angle of the pinion 53, that is, the sliding direction and the sliding amount of the slide member 6A, but also adjust the pressing force against the finger F.

Effects of Second Embodiment

The operating system according to the present embodiment described above produces the following effects in addition to producing effects similar to those of the operating system 1 according to the first embodiment.

The pressure sense device 3A includes the converting member 9A that converts the sliding of the slide member 6A into rectilinear motion of the protruding member 8A to one of the inside and the outside of the fitting member 4A.

According to such a configuration, when the slide member 6A is caused to slide along the outer circumferential surface of the fitting member 4A, the converting member 9A can cause the protruding member 8A to linearly move to the inside or the outside of the fitting member 4A. Therefore, the protruding member 8A can press the finger F in a wide range from a position facing the finger F disposed within the fitting member 4A. In other words, the finger F disposed within the fitting member 4A can be pressed by a relatively wide surface. Hence, the user can be made to feel a pressure sense easily.

In the pressure sense device 3A, the protruding member 8A includes the roller member 81A rotatable about the rotational axis extending along the central axis of the fitting member 4A, and the insertion member 82A that supports the roller member 81A rotatably, and is inserted into the inside of the fitting member 4A. The roller member 81A includes the roller portion 81A1 in contact with the slide member 6A and the rotary shaft portions 81A2 constituting the rotational axis of the roller portion 81A1. The converting member 9A has the guide holes 91A3 long in the +Y direction into which guide holes the rotary shaft portions 81A2 are inserted. The guide holes 91A3 guide the movement of the rotary shaft portions 81A2 along the +Y direction. Incidentally, the +Y direction corresponds to the direction of insertion of the protruding member 8A into the inside of the fitting member 4A.

According to such a configuration, according to the sliding of the slide member 6A, the roller member 81A can be moved in the +Y direction, and in turn, the protruding member 8A can be moved in the +Y direction. Hence, the protruding member 8A can press the finger F disposed within the fitting member 4A.

In the pressure sense device 3A, the slide member 6A includes the abutment portion 62A that abuts against the roller portion 81A1. The abutment portion 62A has the abutment surface 63A that is inclined in a direction of approaching the outer circumferential surface 4S of the fitting member 4A toward the opposite direction −D1 from the first rotational direction +D1. Specifically, the abutment surface 63A is inclined with respect to the outer circumferential surface 4S in the direction of approaching the outer circumferential surface 4S of the fitting member 4A toward the opposite direction −D1 from the first rotational direction +D1.

According to such a configuration, according to the sliding of the slide member 6A, the roller portion 81A1 can be moved along the guide holes 91A3, and in turn, the protruding member 8A can be moved.

In the pressure sense device 3A, the converting member 9A has the opening portion 91A1 within which the protruding member 8A is disposed and which permits movement of the protruding member 8A to the inside of the fitting member 4A.

According to such a configuration, it is possible to regulate rotation of the protruding member 8A about the rotary shaft portions 81A2 inserted in the guide holes 91A3 of the converting member 9A. That is, the opening portion 91A1 functions as a regulating portion that regulates the rotation of the protruding member 8A about the rotary shaft portions 81A2. Hence, the protruding member 8A can be moved stably according to the sliding of the slide member 6A.

In the pressure sense device 3A, the fitting member 4A has the notch 44 that straddles one end of the fitting member 4A and another end of the fitting member 4A in the +Z direction along the central axis of the fitting member 4A. The +Z direction corresponds to the first direction.

According to such a configuration, as in the pressure sense device 3 according to the first embodiment, the inside diameter of the fitting member 4A can be increased according to the outside diameter of the finger F inserted into the inside of the fitting member 4A.

Modifications of Embodiments

The present invention is not limited to the foregoing embodiments, and modifications, and improvements, and the like within a scope where an object of the present invention can be achieved are included in the present invention.

In the foregoing first embodiment, the protruding member 8 is formed in an arcuate shape about the rotational axis Rx2. In other words, the protruding member 8 is formed in an arcuate shape along the outer circumferential surface 4S of the fitting member 4. Moreover, the abutment portion 62 of the slide member 6 slides along the contact portion 83 provided to the surface 81S1 of the main body portion 81 possessed by the protruding member 8. The pressing portion 84 of the protruding member 8 thus protrudes into the inside of the fitting member 4. However, the configuration and shape of the protruding member 8 that protrudes into the inside of the fitting member 4 as the slide member 6 slides are not limited to the above.

For example, the protruding member 8 may be formed in a shape other than the arcuate shape, such as a polygonal shape having one corner provided with the hinge portions 82.

In addition, a configuration may be adopted in which the abutment portion 62 of the slide member 6 that slides in the first rotational direction +D1 presses the protruding member 8 in the first rotational direction +D1, and the protruding member 8 is rotated in the second rotational direction +D2, so that the pressing portion 84 protrudes into the inside of the fitting member 4. In this case, the dimension between the contact portion 83 and the pressing portion 84 does not necessarily need to be increased toward the first rotational direction +D1.

In the foregoing first embodiment, the pressure sense device 3 includes the slide member 6 that slides along the outer circumferential surface 4S of the fitting member 4 about the rotational axis Rx2, and the protruding member 8 that protrudes into the inside of the fitting member 4 as the slide member 6 slides. In the foregoing second embodiment, the pressure sense device 3A includes the slide member 6A that slides along the outer circumferential surface 4S of the fitting member 4A about the rotational axis Rx3, and the protruding member 8A that protrudes into the inside of the fitting member 4A as the slide member 6A slides. However, there is no limitation to this. When the amount of protrusion into the inside of the fitting member 4 changes according to the sliding amount, the slide member and the protruding member may be integrated with or coupled to each other.

In the foregoing first embodiment, the protruding member 8 includes the hinge portions 82, the contact portion 83, and the pressing portion 84. However, there is no limitation to this. For example, a configuration may be adopted in which the protruding member includes a link mechanism including a plurality of links capable of bending with respect to each other, and when at least one of the plurality of links engages with the slide member, another link is inserted into the inside of the fitting member.

In each of the foregoing embodiments, the fitting member 4 or 4A includes the notch 44 that straddles an end portion in the +Z direction and an end portion in the −Z direction along the +Z direction as the first direction. However, there is no limitation to this. The notch 44 may be absent. For example, when the fitting member 4 or 4A has sufficient flexibility or elasticity, the fitting member 4 or 4A can be made to fit the finger F of the user even without the notch 44.

In the foregoing first embodiment, the fitting member 4 has the recessed portion 48 in which a part on the free end side in the protruding member 8 is disposed. However, there is no limitation to this. In a case where the part on the free end side is disposed in the notch 44, for example, or the like, the recessed portion 48 may be absent. In addition, the fitting member 4 may have an opening portion in which the pressing portion 84 of the protruding member 8 is disposed in place of the recessed portion 48.

In the foregoing second embodiment, the fitting member 4A has the recessed portions 45A1 and 46A1 in which the converting member 9A is disposed. However, there is no limitation to this. The recessed portions 45A1 and 46A1 may be absent in a case where a dimension of the notch 44 along the circumferential direction about the rotational axis Rx3 is increased, for example, and the converting member 9A is disposed within the notch 44, and in a case where at least the protruding member 8A is provided within the notch 44.

In each of the foregoing embodiments, the fitting member 4 or 4A includes the fixing portion 42 or 42A to which the driving device 5 or 5A is fixed. However, the fitting member 4 or 4A does not have to include the fixing portion 42 or 42A.

In addition, in the foregoing first embodiment, the driving device 5 is fixed to the fixing portion 42 by the screws SC. In the foregoing second embodiment, the driving device 5A is sandwiched in the +Y direction by the fixing portion 42A. However, there is no limitation to this. The driving device 5 or 5A may be fixed to the fixing portion 42 or 42A by another means.

In each of the foregoing embodiments, the notch 44 and the protruding member 8 or 8A are provided on an opposite side from the fixing portion 42 or 42A in the fitting member 4 or 4A. Specifically, the notch 44 and the protruding member 8 or 8A are provided on an opposite side from the fixing portion 42 or 42A with respect to the center of the opening portion 41 or 41A of the fitting member 4 or 4A as viewed from the +Z direction. However, there is no limitation to this. The positional relation of each of the notch 44 and the protruding member 8 or 8A to the fixing portion 42 or 42A is not limited to the above and can be changed as appropriate.

In each of the foregoing embodiments, the pressure sense device 3 or 3A includes the guide member 7 or 7A provided to the fitting member 4 or 4A. In addition, the fitting member 4 or 4A includes the guide portion 43 that guides the sliding of the slide member 6, together with the guide member 7 or 7A. However, there is no limitation to this. At least one of the guide member 7 or 7A and the guide portion 43 may be absent. Incidentally, in a case where the pressure sense device 3A according to the foregoing second embodiment does not include the guide member 7A, the control board 54 may be provided at a different position in the pressure sense device 3A. In addition, the control board 54 may be integrated with the control unit 27.

In each of the foregoing embodiments, the fitting member 4 or 4A includes the holding portion 49 that protrudes to the inside of the fitting member 4 or 4A from a position on an opposite side from the protruding member 8 or 8A on the inner surface of the fitting member 4 or 4A. However, there is no limitation to this. The holding portion 49 may be absent. In addition, the shape of the holding portion 49 may be a shape corresponding to the shape of a part on a nail side of the finger F as viewed from the +Z direction. In addition, the holding portion 49 may have elasticity, and may be attached to the inner surface of the fitting member 4 or 4A by bonding or the like.

In the foregoing second embodiment, the pressure sense device 3A includes the converting member 9A that converts the sliding of the slide member 6A into rectilinear motion of the protruding member 8A to one of the inside and the outside of the fitting member 4A. Moreover, the converting member 9A is fixed to the supporting portions 47A of the fitting member 4A by the screws SCA. However, there is no limitation to this. The converting member 9A may be formed integrally with the fitting member 4A. In addition, the configuration of the converting member can be changed as appropriate as long as the converting member can convert the sliding of the slide member 6A into rectilinear motion of the protruding member 8A to one of the inside and the outside of the fitting member 4A.

In the foregoing second embodiment, the protruding member 8A includes the roller member 81A and the insertion member 82A. The insertion member 82A supports the rotary shaft portions 81A2 forming the rotational axis of the roller portion 81A1 in contact with the slide member 6A, and moves in the ±Y direction together with the roller member 81A. However, there is no limitation to this. In a case where the protruding member slides along the abutment surface 63A and, as a result, the protruding member moves in the ±Y direction, or the like, the configuration of the protruding member in the present invention is not limited to the above. For example, the protruding member may not include the roller member that is rotatable about the rotational axis along the +Z direction. In this case, the roller member 81A and the insertion member 82A may be integrated with each other.

In the foregoing second embodiment, the roller member 81A includes the pair of rotary shaft portions 81A2 that protrude in the Z direction from the roller portion 81A1. However, there is no limitation to this. Of the pair of rotary shaft portions 81A2, one rotary shaft portion 81A2 may be absent.

In the foregoing second embodiment, the rotary shaft portions 81A2 are inserted into the guide holes 91A3 long in the +Y direction, thereby permitting movement of the protruding member 8A in the ±Y direction. However, there is no limitation to this. Guide pins different from the rotary shaft portions 81A2 may be inserted into the guide holes 91A3. In addition, the converting member may have projecting portions projecting along the +Z direction, and the protruding member may have guide holes or guide grooves into which the projecting portions are inserted.

In the foregoing second embodiment, the abutment portion 62A of the slide member 6A has the abutment surface 63A that is inclined in a direction of separating from the outer circumferential surface 4S of the fitting member 4A toward the first rotational direction +D1. That is, the abutment portion 62A has the abutment surface 63A that is inclined in a direction of approaching the outer circumferential surface 4S toward the opposite direction −D1 from the first rotational direction +D1. However, there is no limitation to this. For example, in a case where the rotary shaft portions 81A2 forming the rotational axis of the roller portion 81A1 are provided in such a manner as to be eccentric with respect to the roller portion 81A1, or the like, the abutment portion 62A may have an abutment surface along the outer circumferential surface 4S rather than the abutment surface 63A inclined as described above.

In the foregoing second embodiment, the converting member 9A has the opening portion 91A1 within which the protruding member 8A is disposed. However, there is no limitation to this.

The opening portion 91A1 may be absent. In addition, in place of the opening portion 91A1, a regulating portion may be provided which permits movement of the protruding member 8A to the inside and the outside of the fitting member 4A and regulates movement of the protruding member 8A in the other directions.

In each of the foregoing embodiments, the pressure sense device 3 or 3A is provided to the finger portions 211 to 215 in the glove 21 of the operating device 2. However, there is no limitation to this. The pressure sense device 3 or 3A may be attached directly to the finger F of the user. In addition, a part of the human body inserted into the fitting member 4 or 4A of the pressure sense device 3 or 3A is not limited to the finger F and may be another part. For example, the pressure sense device may include a fitting member fitted to a wrist of the user.

In addition, the fitting member 4 or 4A is formed in a cylindrical shape, and the fitting member 4 or 4A has the opening portion 41 or 41A that penetrates along the +Z direction. However, there is no limitation to this. The fitting member may include a recessed portion into which a part of the human body can be inserted in the +Z direction in place of the opening portion 41 or 41A.

In each of the foregoing embodiments, the central axis of the fitting member 4 or 4A is an axis that passes through the center of the fitting member 4 or 4A (opening portion 41 or 41A) as viewed from the +Z direction and which is along the +Z direction. However, there is no limitation to this. The central axis of the fitting member 4 or 4A may be an axis that is along the axial direction of the fitting member 4 or 4A, and is set within the fitting member 4 or 4A as viewed from the +Z direction. Therefore, the central axis of the fitting member 4 does not necessarily need to pass through the center of the fitting member 4 (opening portion 41) as viewed from the +Z direction and may pass through a position shifted from the center. In addition, the same is true for the rotational axis Rx2 or Rx3. That is, the rotational axis Rx2 or Rx3 may be an axis that is along the axial direction of the fitting member 4 or 4A, and is set within the fitting member 4 or 4A. Therefore, it suffices for the slide member 6 or 6A to be able to slide along the outer circumferential surface 4S of the fitting member 4 or 4A in one circumferential direction and the other circumferential direction about the rotational axis Rx2 or Rx3.

In each of the foregoing embodiments, the pressure sense device 3 or 3A is employed by the operating device 2. However, there is no limitation to this. The pressure sense device 3 or 3A may be employed by another electronic apparatus, or may be used as an independent device.

In addition, the operation target of the operating device 2 including the pressure sense device 3 or 3A is not limited to the puppet operating device 11, and may be another device such as a robotic hand or a manipulator or may be a character in a game or the like.

SUMMARY OF THE PRESENT INVENTION

A summary of the present invention is appended in the following.

[1] A pressure sense device according to a first aspect of the present disclosure includes a tubular fitting member, a slide member disposed so as to be slidable in a first rotational direction about a central axis of the fitting member and an opposite direction from the first rotational direction along an outer circumferential surface of the fitting member, a driving device configured to cause the slide member to slide, and a protruding member configured to protrude into an inside of the fitting member as the slide member slides in the first rotational direction.

According to such a configuration, a part of a human body of a user inserted within the fitting member can be pressed. At this time, the protruding member protrudes into the inside of the fitting member as the slide member slides in the first rotational direction. According to this, an amount of protrusion of the protruding member into the inside of the fitting member can be adjusted by adjusting an amount of sliding of the slide member in the first rotational direction. It is therefore possible to adjust a pressing force against a part of the human body disposed within the fitting member. Hence, it is possible to configure a pressure sense device that can adjust the pressing force against a part of the human body.

[2] In the pressure sense device according to [1], the protruding member may include a hinge portion rotatably supported by the fitting member, a contact portion disposed in the first rotational direction with respect to the hinge portion and configured to be in contact with the slide member, and a pressing portion configured to be inserted into the inside of the fitting member when the slide member slides in the first rotational direction in a state of being in contact with the contact portion.

According to such a configuration, when the slide member in contact with the contact portion slides in the first rotational direction, the protruding member can be caused to rotate about the hinge portion in a direction of protruding into the inside of the fitting member. Thus, a part of the human body disposed within the fitting member can be pressed by the pressing portion.

[3] In the pressure sense device according to [2], a dimension between the contact portion and the pressing portion may be increased toward the first rotational direction.

According to such a configuration, the pressing portion can be caused to protrude into the inside of the contact member as the slide member in contact with the contact portion slides in the first rotational direction. Hence, it is possible to cause the pressing portion to protrude into the inside of the fitting member according to the amount of sliding of the slide member, and in turn, adjust the pressing force by the pressing portion.

[4] In the pressure sense device according to any one of [1] to [3], the fitting member may have a notch that straddles one end of the fitting member and another end of the fitting member in a first direction along the central axis of the fitting member.

According to such a configuration, the inside diameter of the fitting member can be increased according to the outside diameter of a part of the human body inserted into the inside of the fitting member. Hence, the fitting member can be made to fit a part of the human body. In addition, the pressure sense device can be fitted to a plurality of positions having different outside diameters in the human body, and even in a case where another user is fitted with the pressure sense device, the fitting member, and in turn the pressure sense device, can be made to fit.

[5] In the pressure sense device according to [4], the fitting member may have a recessed portion that is recessed in the first rotational direction from an end edge in the first rotational direction among end edges of the notch, and a part in the first rotational direction in the protruding member may be disposed within the recessed portion.

According to such a configuration, the part in the first rotational direction in the protruding member is disposed within the recessed portion. The protruding member can thus be disposed such that the part in the first rotational direction does not interfere with the fitting member. Hence, it is possible to not only facilitate the protrusion of the part in the first rotational direction into the inside of the fitting member but also form the protruding member in a large size and consequently increase an amount of protrusion of the pressing portion into the inside of the fitting member.

[6] In the pressure sense device according to [4] or [5], the fitting member may include a fixing portion that projects from the outer circumferential surface of the fitting member and to which the driving device is fixed, and the notch may be disposed on an opposite side from the fixing portion in the fitting member.

According to such a configuration, the driving device can be fixed to the fitting member, and therefore, a driving force of the driving device can be easily transmitted to the slide member that slides along the outer circumferential surface of the fitting member. In addition, in a case where a part of the protruding member is disposed in the notch, the driving device and the protruding member are provided to parts on opposite sides from each other in the fitting member. It is therefore possible to facilitate attachment of the driving device and the protruding member to the fitting member.

[7] The pressure sense device according to [1] may include a converting member configured to convert the sliding of the slide member into rectilinear motion of the protruding member to one of the inside and an outside of the fitting member.

According to such a configuration, when the slide member is caused to slide along the outer circumferential surface of the fitting member, the converting member can cause the protruding member to linearly move to the inside or the outside of the fitting member. Therefore, the protruding member can press a part of the human body in a wide range, for example, from a position facing the part of the human body disposed within the fitting member. In other words, the part of the human body disposed within the fitting member can be pressed by a relatively wide surface. Hence, the human body can be made to feel a pressure sense easily.

[8] In the pressure sense device according to [7], the protruding member may include a roller member including a roller portion in contact with the slide member and a rotary shaft portion constituting a rotational axis of the roller portion, the roller member being rotatable about the rotational axis extending along the central axis of the fitting member, and an insertion member supporting the roller member rotatably and configured to be inserted into the inside of the fitting member, the converting member may have a guide hole in which the rotary shaft portion is inserted and that is long in a direction of insertion of the protruding member into the inside of the fitting member, and the guide hole may guide movement of the rotary shaft portion along the insertion direction.

According to such a configuration, according to the sliding of the slide member, the roller member can be caused to move in the insertion direction, and in turn, the protruding member can be caused to move in the insertion direction. Hence, the protruding member can press a part of the human body disposed within the fitting member.

[9] In the pressure sense device according to [8], the slide member may include an abutment portion configured to abut against the roller portion, and the abutment portion may have an abutment surface that is inclined in a direction of approaching the outer circumferential surface of the fitting member toward the opposite direction from the first rotational direction.

According to such a configuration, according to the sliding of the slide member, the roller member can be caused to move along the guide hole, and in turn, the protruding member can be caused to move.

[10] In the pressure sense device according to any one of [7] to [9], the converting member may have an opening portion within which the protruding member is disposed and that permits movement of the protruding member to the inside of the fitting member.

According to such a configuration, it is possible to regulate rotation of the protruding member about the rotary shaft portion inserted in the guide hole of the converting member. Hence, the protruding member can be caused to move stably according to the sliding of the slide member.

[11] In the pressure sense device according to any one of [7] to [10], the fitting member may have a notch that straddles one end of the fitting member and another end of the fitting member in a first direction along the central axis of the fitting member.

According to such a configuration, as described above, the inside diameter of the fitting member can be increased according to the outside diameter of a part of the human body inserted into the inside of the fitting member.

[12] The pressure sense device according to any one of [1] to [11] may include a guide member attached to the outer circumferential surface of the fitting member, the fitting member may have a guide portion provided to the outer circumferential surface of the fitting member and configured to guide the sliding of the slide member, and the guide member and the guide portion may sandwich the slide member.

According to such a configuration, it is possible to facilitate the sliding of the slide member along the outer circumferential surface of the fitting member. In addition, because the slide member is disposed between the guide member and the guide portion, it is possible to suppress detachment of the slide member from the fitting member.

[13] In the pressure sense device according to any one of [1] to [12], the fitting member may have a holding portion configured to protrude to the inside of the fitting member from a position on an opposite side from the protruding member on an inner surface of the fitting member.

According to such a configuration, the holding portion comes into contact with a part of the human body inserted within the fitting member, making is possible to suppress the rocking of the part of the human body within the fitting member.

In addition, because a part of the protruding member protrudes into the inside of the fitting member in a state in which the holding portion is in contact with the part of the human body, the protruding member can be made to come into contact with the part of the human body easily. Hence, it is possible to facilitate applying the pressing force to the part of the human body inserted within the fitting member.

[14] An operating device according to a second aspect of the present disclosure includes the pressure sense device according to any one of [1] to [13].

According to such a configuration, effects similar to those of the pressure sense device according to the first aspect can be produced.

[15] The operating device according to [14] may include a glove that is configured to be fitted to one hand of a user and that includes a finger portion into which a finger of the user is inserted, and the pressure sense device may be provided to the finger portion.

According to such a configuration, it is possible to configure an operating device that facilitates fitting the finger with the pressure sense device.

[16] The operating device according to [14] or [15] may include a plurality of the pressure sense devices, and a control unit configured to individually control each of the plurality of pressure sense devices.

According to such a configuration, pressure senses can be individually given to parts provided with the plurality of pressure sense devices in the body of the user. Hence, versatility of the operating device can be enhanced.

REFERENCE SIGNS LIST

1: Operating system
2: Operating device
21: Glove
3, 3A: Pressure sense device
4, 4A: Fitting member
41, 41A: Opening portion
42, 42A: Fixing portion
43, 43A: Guide portion
44: Notch
45, 45A, 46, 46A: End edge
47, 47A: Supporting portion
48: Recessed portion
49: Holding portion
4S: Outer circumferential surface
5, 5A: Driving device
51: Driving device main body
52: Rotor
53: Pinion
54: Control board
6, 6A: Slide member
61: Rack
62, 62A: Abutment portion
63A: Abutment surface
7, 7A: Guide member
8, 8A: Protruding member
81: Main body portion
81A: Roller member
81A1: Roller portion
81A2: Rotary shaft portion
81S1: Surface 81S2: Surface
82: Hinge portion
82A: Insertion member
82A1: Pressing portion
82A2: Supporting portion
82A3: Arrangement portion
82A4: Through hole
83: Contact portion
84: Pressing portion
9A: Converting member
91A: Main body portion
91A1: Opening portion
91A2: Projecting portion
91A3: Guide hole
92A: Fixing portion
92A1: Hole portion
93A: Regulating portion
+D1: First rotational direction
−D1: Opposite direction from the first rotational direction

The invention claimed is:

1. A pressure sense device comprising:
a tubular fitting member;
a slide member disposed so as to be slidable in a first rotational direction about a central axis of the tubular fitting member and an opposite direction from the first rotational direction along an outer circumferential surface of the tubular fitting member;
a driving device configured to cause the slide member to slide; and
a protruding member configured to protrude into an inside of the tubular fitting member as the slide member slides in the first rotational direction, wherein the protruding member includes:
a hinge portion rotatably supported by the tubular fitting member;
a contact portion disposed in the first rotational direction with respect to the hinge portion and configured to be in contact with the slide member; and
a pressing portion configured to be inserted into the inside of the tubular fitting member when the slide member slides in the first rotational direction in a state of being in contact with the contact portion.

2. The pressure sense device according to claim 1, wherein a dimension between the contact portion and the pressing portion is increased toward the first rotational direction.

3. The pressure sense device according to claim 1, wherein the tubular fitting member has a notch that straddles one end of the tubular fitting member and another end of the tubular fitting member in a first direction along the central axis of the tubular fitting member.

4. The pressure sense device according to claim 3, wherein
the tubular fitting member has a recessed portion that is recessed in the first rotational direction from an end edge in the first rotational direction among end edges of the notch, and
a part in the first rotational direction in the protruding member is disposed within the recessed portion.

5. The pressure sense device according to claim 3, wherein
the tubular fitting member includes a fixing portion that projects from the outer circumferential surface of the tubular fitting member and to which the driving device is fixed, and
the notch is disposed on an opposite side from the fixing portion in the tubular fitting member.

6. The pressure sense device according to claim 1, comprising: a guide member attached to the outer circumferential surface of the tubular fitting member, wherein the tubular fitting member has a guide portion provided to the outer circumferential surface of the tubular fitting member and configured to guide the sliding of the slide member, and the guide member and the guide portion sandwich the slide member.

7. The pressure sense device according to claim 1, wherein the tubular fitting member has a holding portion configured to protrude to the inside of the tubular fitting member from a position on an opposite side from the protruding member on an inner surface of the tubular fitting member.

8. A pressure sense device comprising:
a tubular fitting member;
a slide member disposed so as to be slidable in a first rotational direction about a central axis of the tubular fitting member and an opposite direction from the first rotational direction along an outer circumferential surface of the tubular fitting member;
a driving device configured to cause the slide member to slide;
a protruding member configured to protrude into an inside of the tubular fitting member as the slide member slides in the first rotational direction; and
a converting member configured to convert the sliding of the slide member into rectilinear motion of the protruding member to one of the inside and an outside of the tubular fitting member.

9. The pressure sense device according to claim 8, wherein
the protruding member includes
a roller member including a roller portion in contact with the slide member and a rotary shaft portion constituting a rotational axis of the roller portion, the roller member being rotatable about the rotational axis extending along the central axis of the tubular fitting member, and
an insertion member supporting the roller member rotatably and configured to be inserted into the inside of the tubular fitting member,
the converting member has a guide hole in which the rotary shaft portion is inserted and that is long in a direction of insertion of the protruding member into the inside of the tubular fitting member, and
the guide hole guides movement of the rotary shaft portion along the insertion direction.

10. The pressure sense device according to claim 9, wherein
the slide member includes an abutment portion configured to abut against the roller portion,
the abutment portion has an abutment surface that is inclined in a direction of approaching the outer circumferential surface of the tubular fitting member toward the opposite direction from the first rotational direction.

11. The pressure sense device according to claim 8, wherein the converting member has an opening portion within which the protruding member is disposed and that permits movement of the protruding member to the inside of the tubular fitting member.

12. The pressure sense device according to claim 8, wherein the tubular fitting member has a notch that straddles one end of the tubular fitting member and another end of the tubular fitting member in a first direction along the central axis of the tubular fitting member.

13. An operating device comprising:
a pressure sense device including
- a tubular fitting member,
- a slide member disposed so as to be slidable in a first rotational direction about a central axis of the tubular fitting member and an opposite direction from the first rotational direction along an outer circumferential surface of the tubular fitting member,
- a driving device configured to cause the slide member to slide, and
- a protruding member configured to protrude into an inside of the tubular fitting member as the slide member slides in the first rotational direction, wherein the protruding member includes:
  - a hinge portion rotatably supported by the tubular fitting member;
  - a contact portion disposed in the first rotational direction with respect to the hinge portion and configured to be in contact with the slide member; and
  - a pressing portion configured to be inserted into the inside of the tubular fitting member when the slide member slides in the first rotational direction in a state of being in contact with the contact portion.

14. The operating device according to claim 13, comprising:
a glove that is configured to be fitted to one hand of a user and that includes a finger portion into which a finger of the user is inserted, wherein
the pressure sense device is provided to the finger portion.

15. The operating device according to claim 13, comprising:
a plurality of the pressure sense devices; and
a control unit configured to individually control each of the plurality of pressure sense devices.

\* \* \* \* \*